Figure 1:
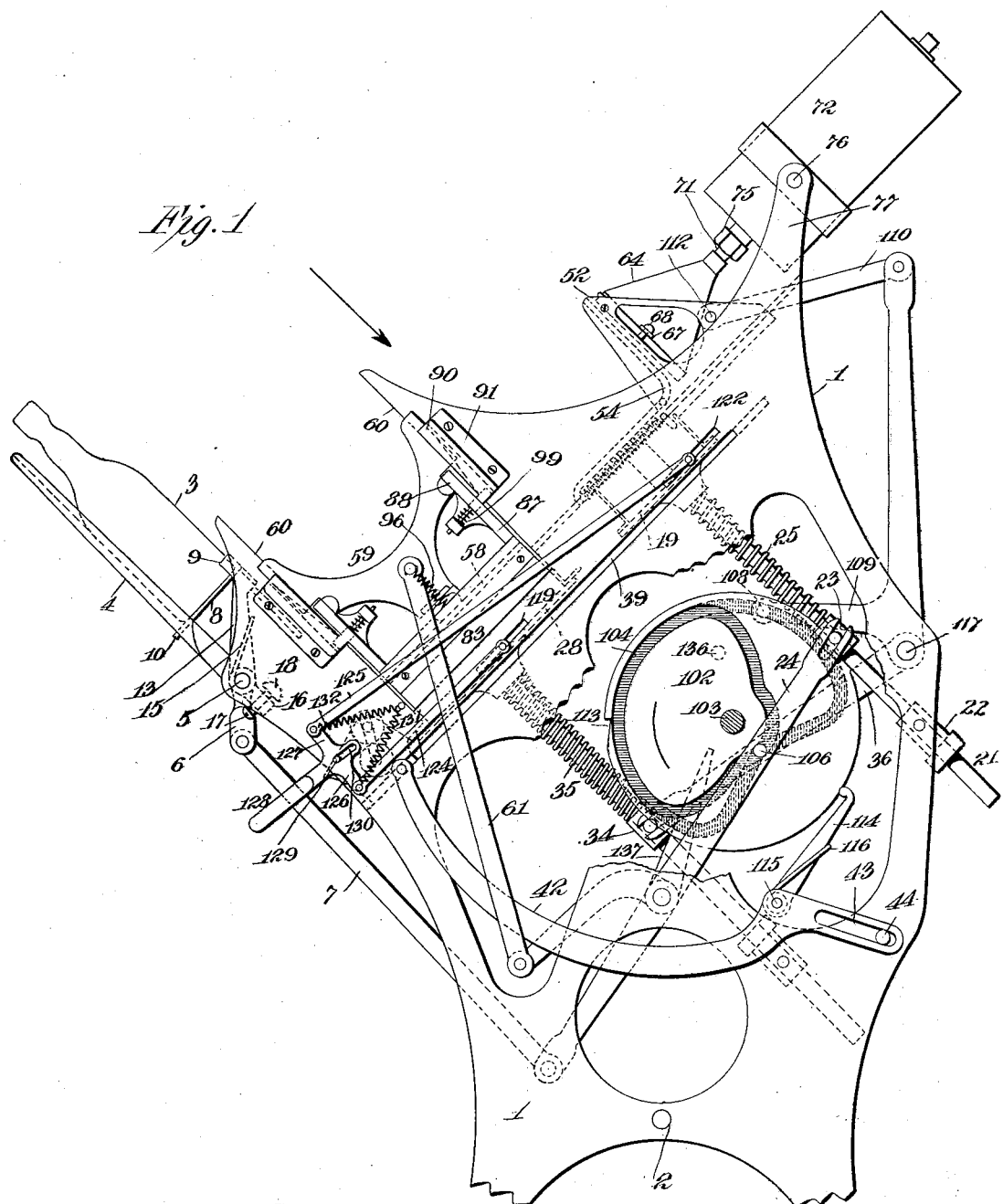

No. 841,013. PATENTED JAN. 8, 1907.
C. HOLLAND.
BOTTLE LABELING MACHINE.
APPLICATION FILED JULY 7, 1904.

9 SHEETS—SHEET 1.

Witnesses:
John H. Potsch.
Albert Smith.

Inventor
Curtis Holland
By Dyer & Dyer
Attorneys.

No. 841,013. PATENTED JAN. 8, 1907.
C. HOLLAND.
BOTTLE LABELING MACHINE.
APPLICATION FILED JULY 7, 1904.

9 SHEETS—SHEET 2.

Witnesses
John Holsch
Albert Smith

Inventor
Curtis Holland
By Dyer & Dyer
Attorneys.

No. 841,013. PATENTED JAN. 8, 1907.
C. HOLLAND.
BOTTLE LABELING MACHINE.
APPLICATION FILED JULY 7, 1904.

9 SHEETS—SHEET 3.

Witnesses:
John L. Potsch
Albert Smith

Inventor
Curtis Holland
By Dyer & Dyer
Attorneys.

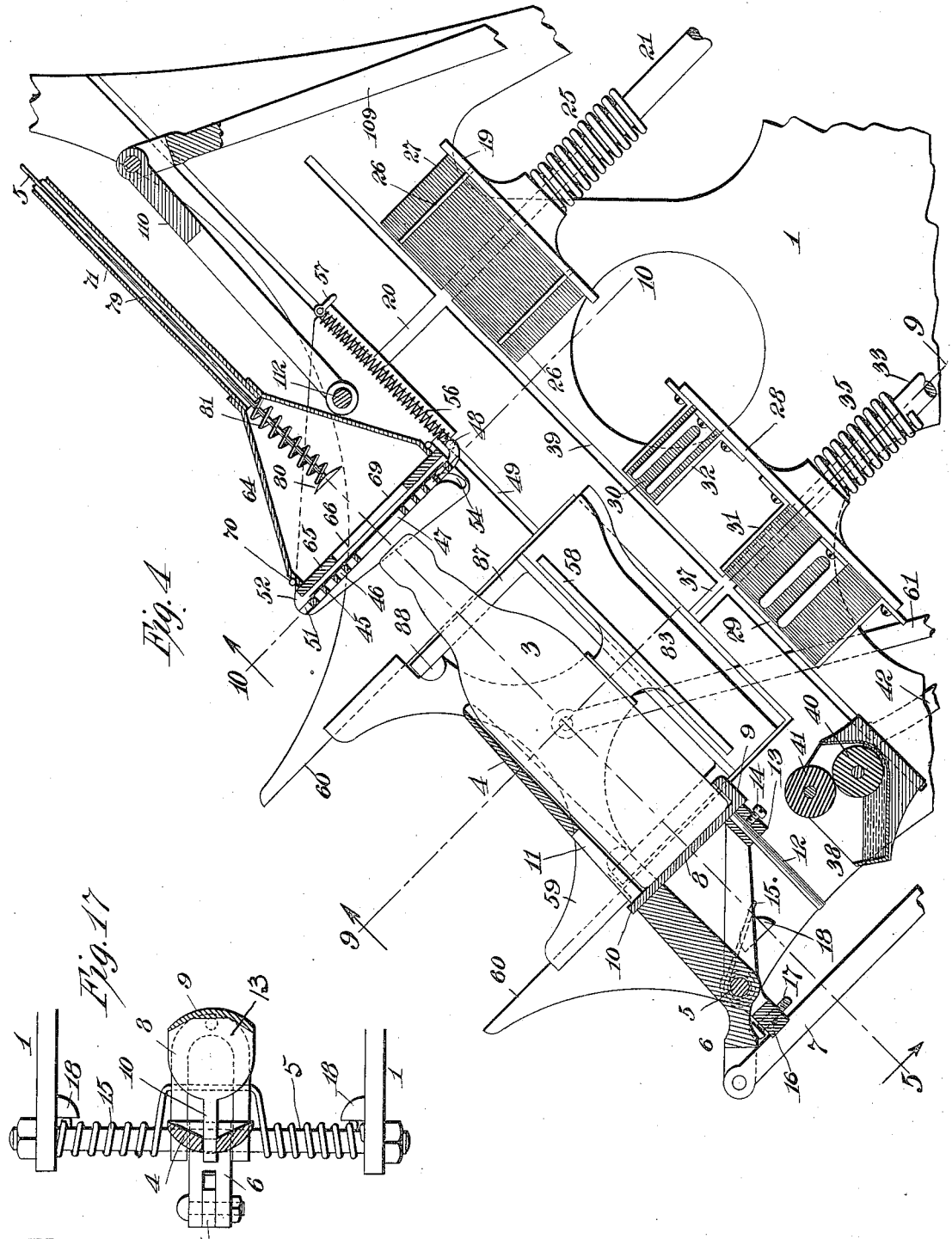

No. 841,013.
PATENTED JAN. 8, 1907.
C. HOLLAND.
BOTTLE LABELING MACHINE.
APPLICATION FILED JULY 7, 1904.
9 SHEETS—SHEET 5.
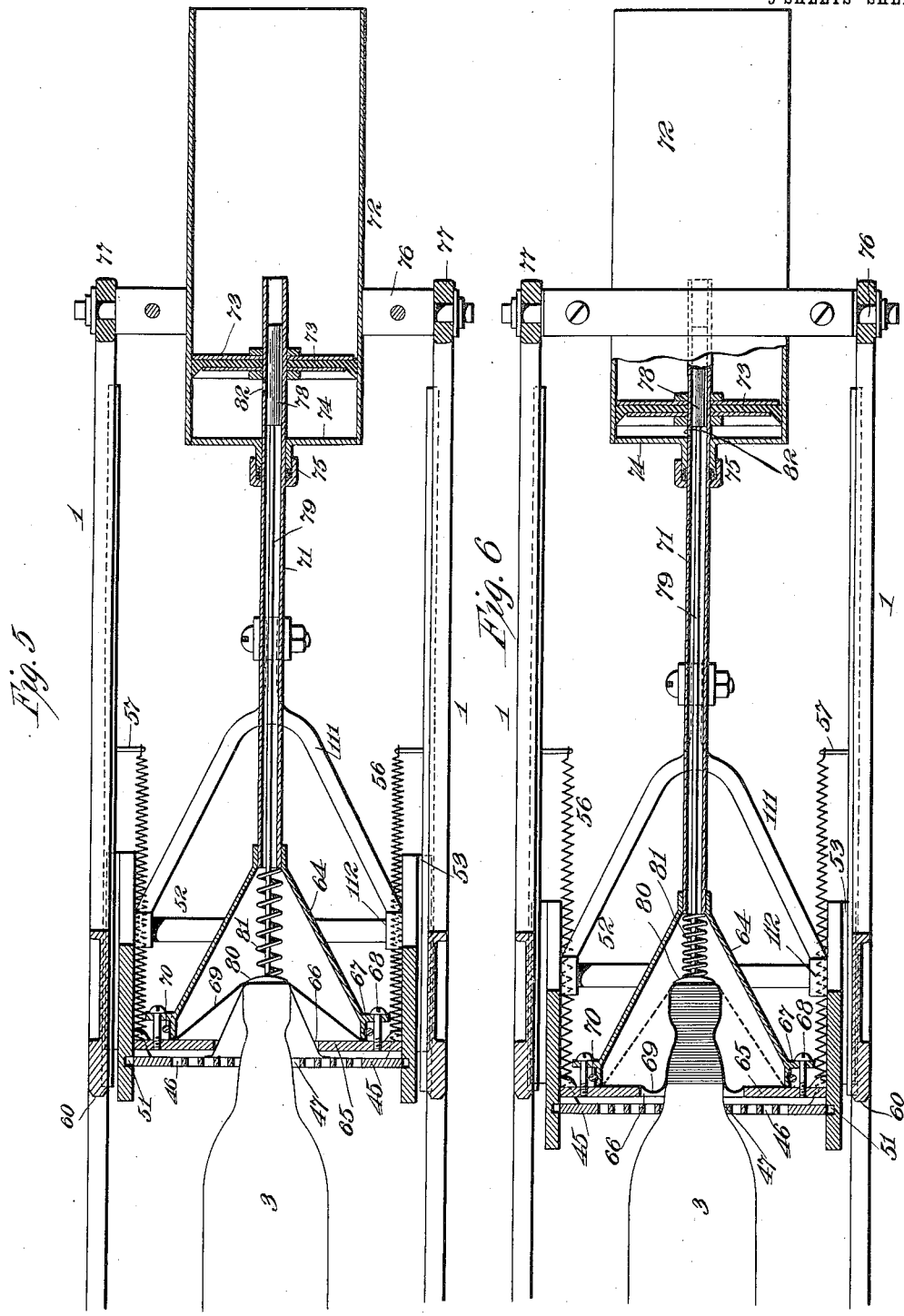

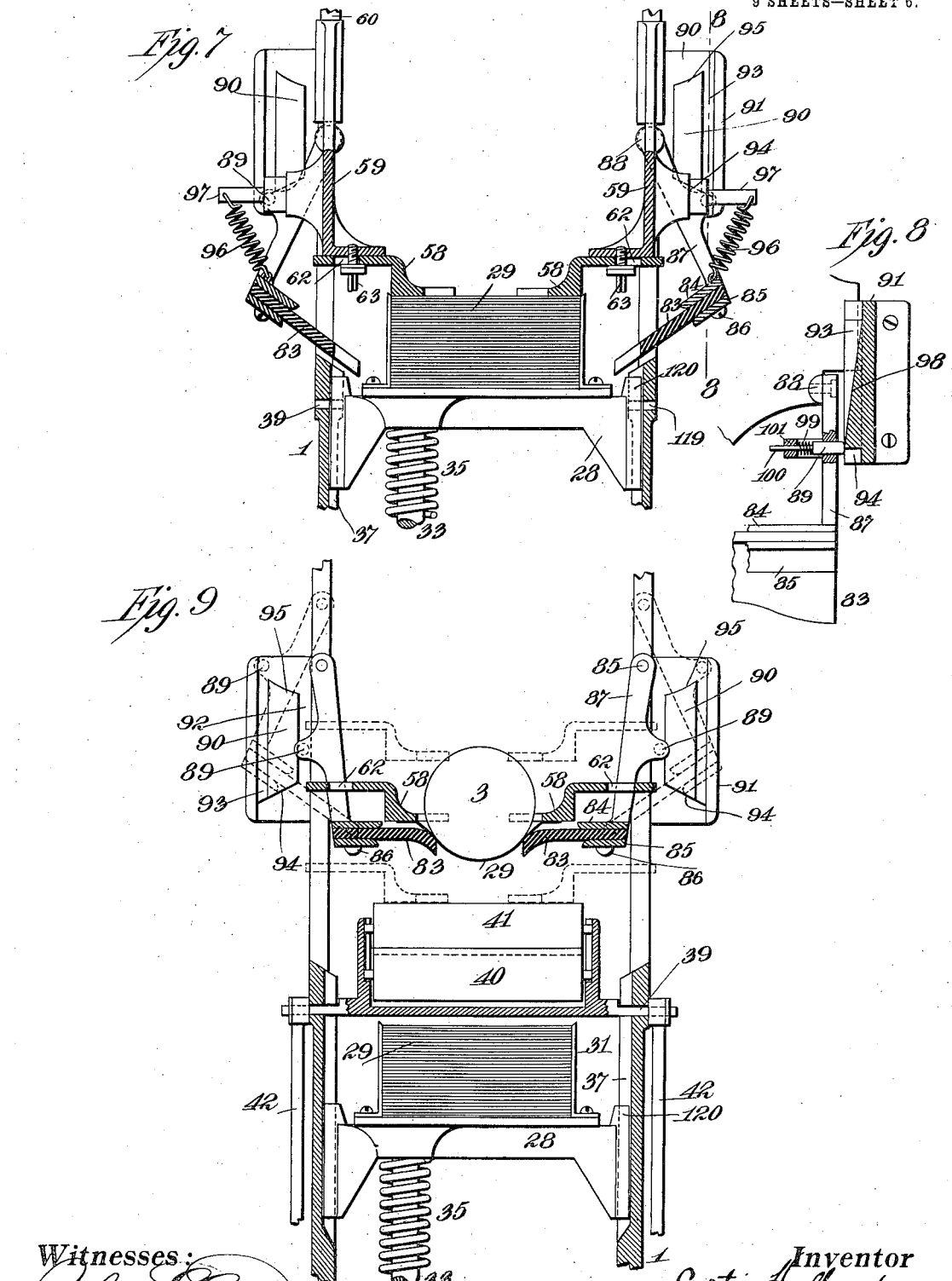

No. 841,013. PATENTED JAN. 8, 1907.
C. HOLLAND.
BOTTLE LABELING MACHINE.
APPLICATION FILED JULY 7, 1904.
9 SHEETS—SHEET 7.
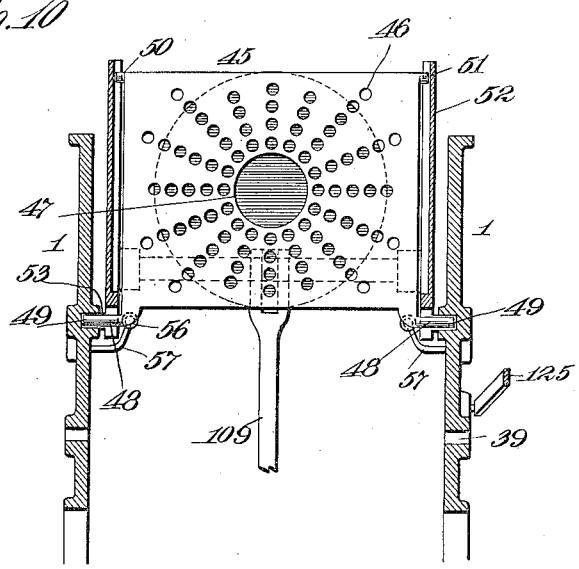
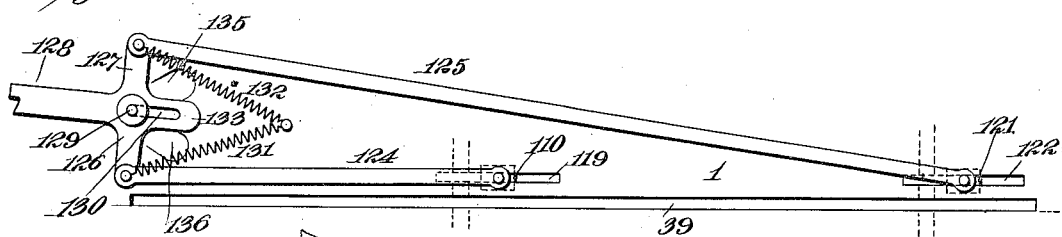
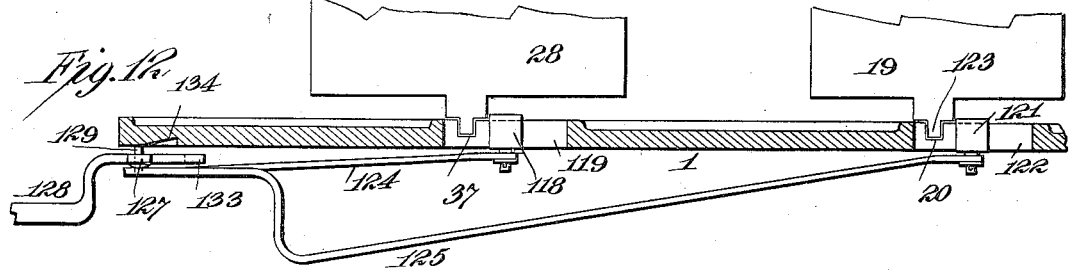
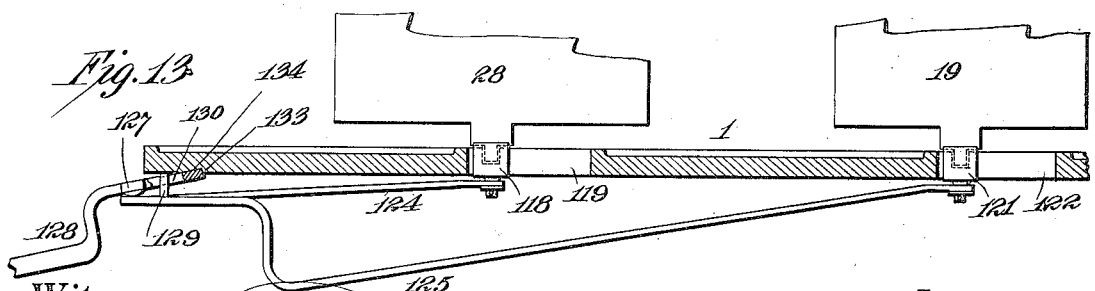
Witnesses:
John Potsch
Albert Smith
Inventor
Curtis Holland
By Dyer & Dyer
Attorneys.

No. 841,013. PATENTED JAN. 8, 1907.
C. HOLLAND.
BOTTLE LABELING MACHINE.
APPLICATION FILED JULY 7, 1904.
9 SHEETS—SHEET 8.
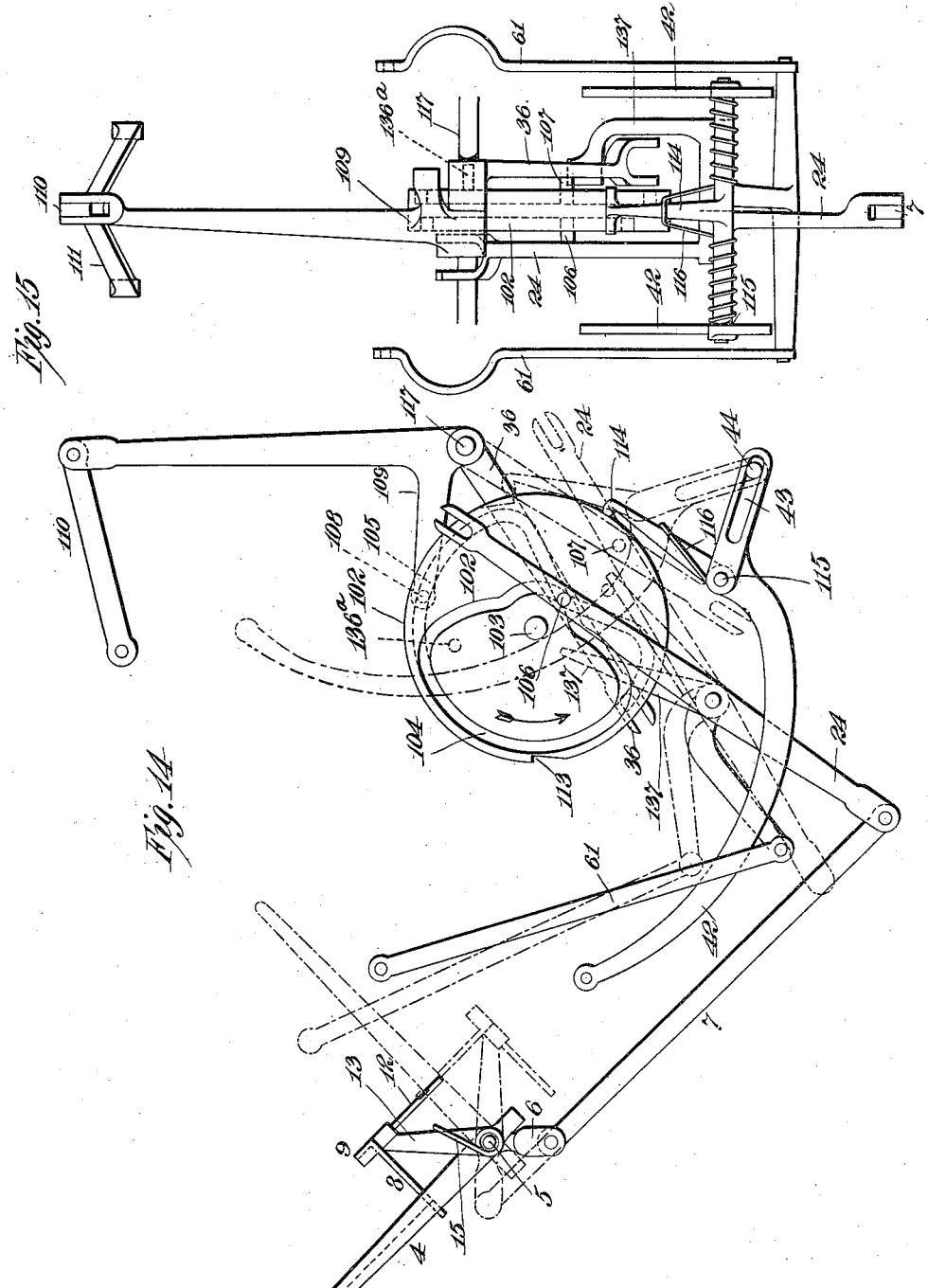
Witnesses:
Inventor
Curtis Holland
By Dyer & Dyer
Attorneys.

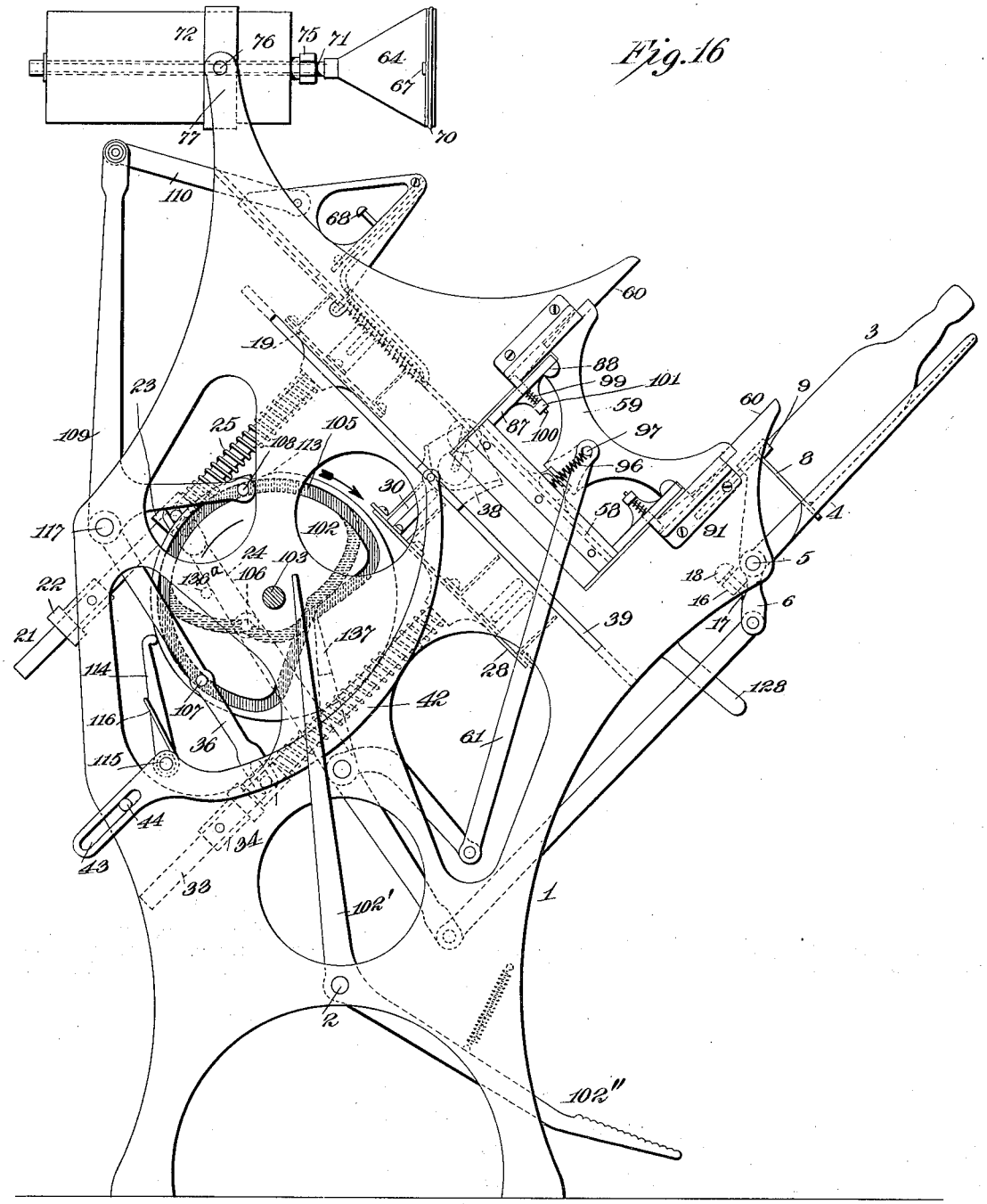

UNITED STATES PATENT OFFICE.

CURTIS HOLLAND, OF BUTTE, MONTANA.

BOTTLE-LABELING MACHINE.

No. 841,013.　　　Specification of Letters Patent.　　　Patented Jan. 8, 1907.

Application filed July 7, 1904. Serial No. 215,683.

*To all whom it may concern:*

Be it known that I, CURTIS HOLLAND, a citizen of the United States, residing in Butte, county of Silverbow, State of Montana, have invented a certain new and useful Improvement in Bottle-Labeling Machines, of which the following is a specification.

The present invention relates to improvements in machines for simultaneously applying labels to the sides and necks of bottles or other articles and tin-foil or analogous material over their stoppers or corks.

The objects of the invention are to produce a device which will evenly and expeditiously apply tin-foil and affix labels in a single operation and entirely automatically.

Other objects are to produce a machine which may be used in connection with bottles of different sizes and shapes and which may use labels of different sizes and which will employ tin-foil in the sheet form instead of in rolls, as has been the case heretofore.

Other objects are to produce a device which may, instead of tin-foil, apply a label or seal to the cork and will apply the label or tin-foil to the bottle by moving the label or tin-foil against the bottle, which is held stationary, and without the use of rotary brushes, as has heretofore been necessary.

Another object is to provide mechanism which will move the gummed or paste-covered labels a very short distance, so that there will be no danger of their becoming blown away or lost.

Other objects of the invention will more clearly appear from the following specification and claims.

I attain these objects by the mechanism illustrated in the accompanying drawings, in which—

Figure 2:
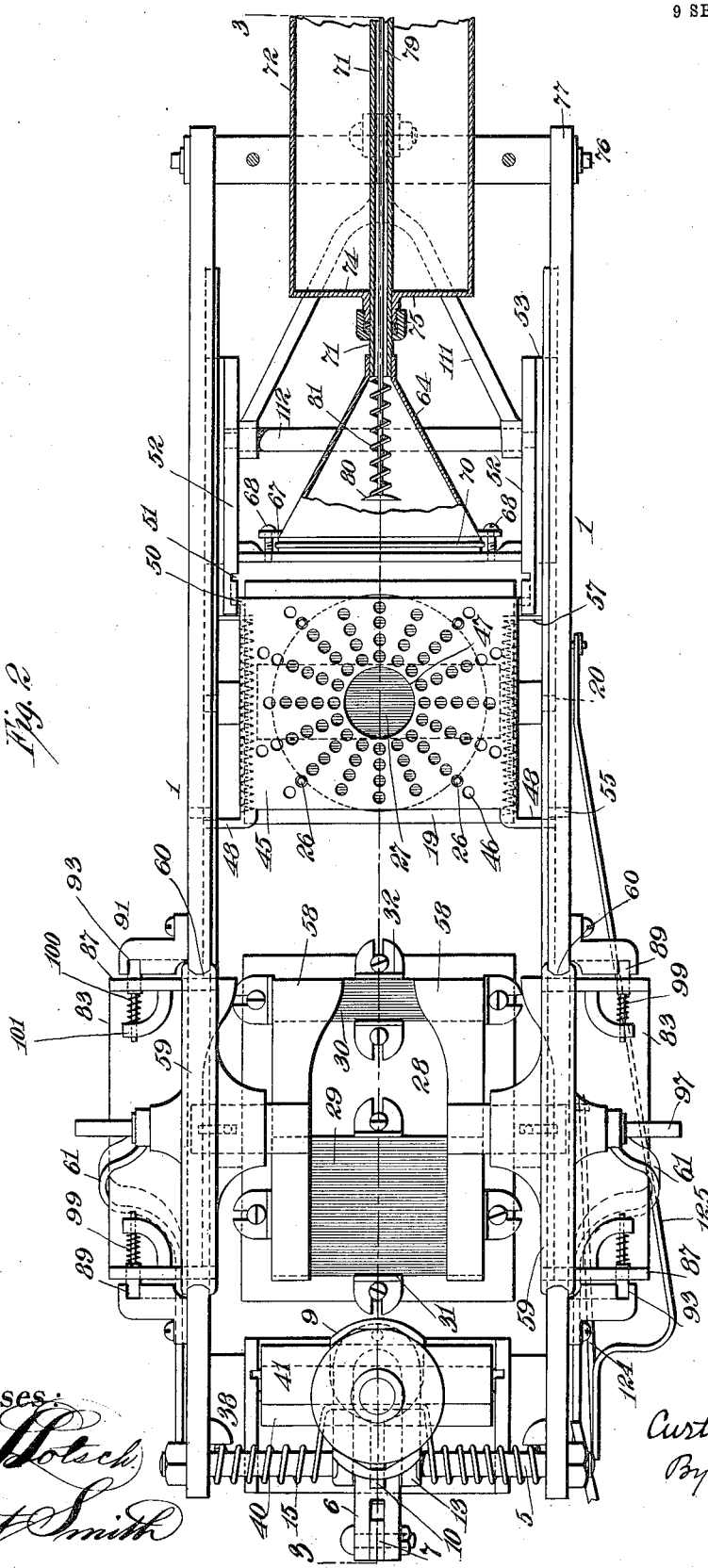
Figure 3:
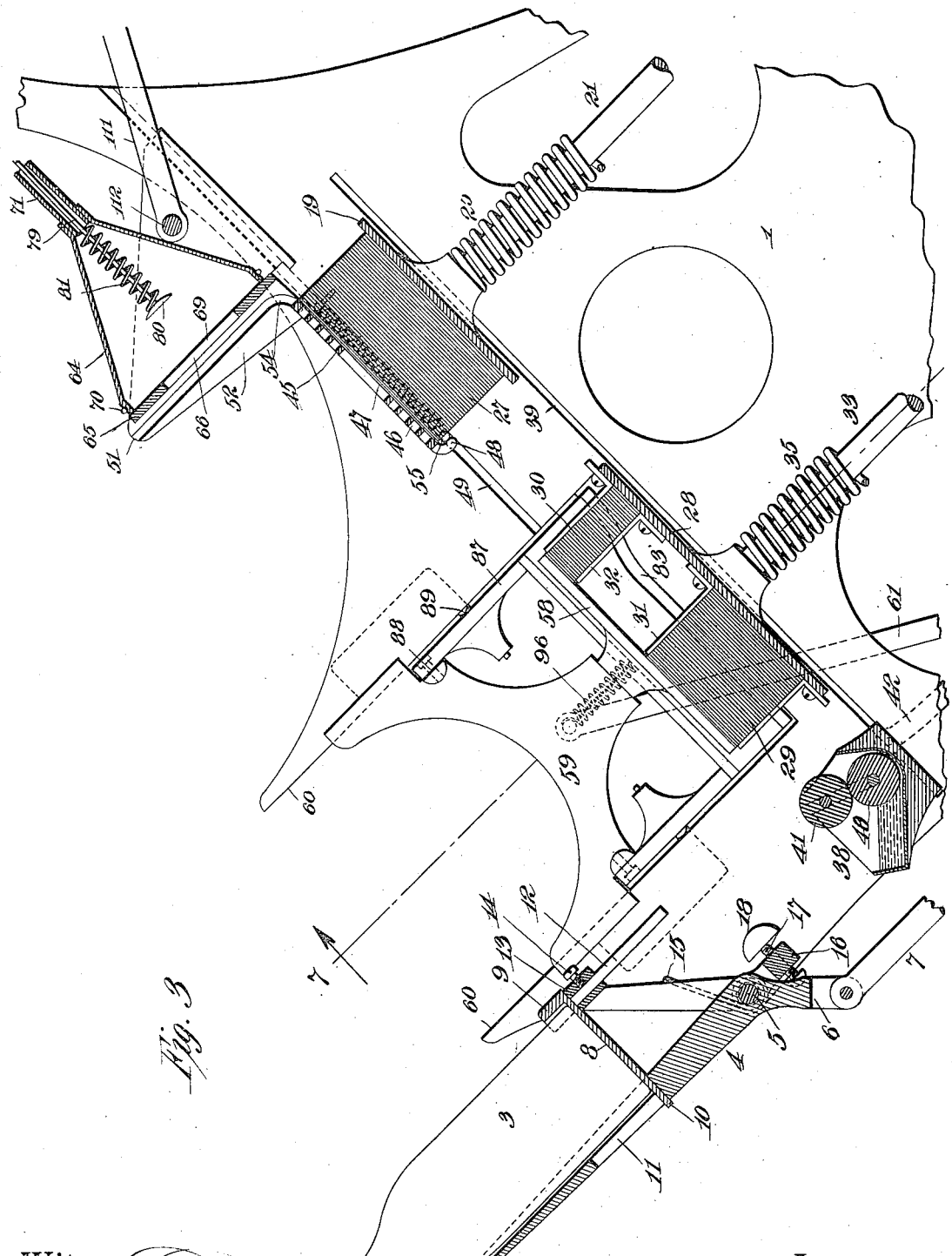

Figure 1 is a side elevation of the operative portions of the machine with parts broken away, so that constructions of other parts will be more clearly shown. Fig. 2 is a plan view, partly in section, looking in the direction of the arrow in Fig. 1. Fig. 3 is a sectional view on the lines 3 3 of Fig. 2. Fig. 4 is a sectional view on the same lines, but with the parts in a different position. Figs. 5 and 6 are sections on the lines 5 5 of Fig. 4, showing the parts in different positions. Fig. 7 is a section on the lines 7 7 of Fig. 3 looking in the direction of the arrow. Fig. 8 is a section on the lines 8 8 of Fig. 7. Fig. 9 is a section on the lines 9 9 of Fig. 4 looking in the direction of the arrow. Fig. 10 is a section on the lines 10 10 of Fig. 4 looking in the direction of the arrow. Figs. 11, 12, and 13 are detail views of the throw-off mechanism. Fig. 14 is a side view, and Fig. 15 is a front view, of the system of levers and the mechanism which coöperates therewith. Fig. 16 is a side view of the machine, taken from the opposite side from which Fig. 1 is taken, but with the driving-pulley omitted; and Fig. 17 is a sectional view of the bottle-support.

In all of the several views like parts are designated by the same reference characters.

In carrying out my invention I combine some or all of the following instrumentalities which go to make up the entire machine:

First, a frame within which the several devices and the mechanism for actuating them are contained; second, a bottle-support which comprises a clamping and tilting device adapted to receive the bottle and to securely clamp it, combined with means for tilting the bottle in position to receive both the tin-foil and the labels; third, a tin-foil holding and delivering device adapted to hold and deliver a pile of cut tin-foil; fourth, a label holding and delivering device adapted to hold a pile of both body and neck labels; fifth, a paste-applying device containing paste-distributing rolls, said device reciprocating and operating above both the tin-foil and label holding and delivering devices; sixth, a tin-foil pick-up and transferring device which has a tilting and reciprocating movement, said device having a center opening adapted to surround the neck of the bottle; seventh, a label pick-up device, the said device having a rising-and-falling movement; eighth, a compressing device for affixing the tin-foil to the end of the bottle-neck, said compressing device comprising a suitable receiving air-chamber having elastic and flexible front portions removably connected therewith, the said device reciprocating in axial line with the bottle while the bottle is held stationary above and parallel with the label pick-up; ninth, a compressor for supplying air to the compressing-chamber having means for regulating the passage of air to the chamber and allowing the air to be compressed only by the presence of a bottle within the machine; tenth, a wiper or device for smoothing the labels on the body and neck of the bottle, said smoothing device rising with and swinging under the label pick-up; eleventh, mechanism for operating all of the foregoing devices, comprising a disk with a cam-groove on one side, a cam-groove and stud on the opposite side, and a stud or notch on its periphery and suitable levers for operating the foregoing devices in the proper sequence; twelfth, a throw-off device adapted to prevent the application either of the tin-foil or labels, or both, as may be desired.

*The frame.*—The necessary mechanism is contained within a suitable frame which comprises parallel side pieces 1 1, secured together at a suitable distance by means of bolts or braces 2 2. The side pieces may be of cast metal with openings for lightness and ribs and flanges for strength, as shown. Most of the operating mechanism is arranged in the space between the side pieces of the frame; but some of the levers are outside of the frame and many of the necessary guides, slideways, &c., are formed integral with the side pieces, as will be described in connection with the particular mechanism.

*The bottle support and lock.*—The bottle 3 is placed upon a support 4. This support may be tilted to the position shown in Fig. 1 to allow the bottle to be applied. The supporting-arm 4 is secured to a shaft 5, pivoted to the side pieces and has a depending portion 6, which is connected to a link 7, the said link being reciprocated by suitable mechanism, which will be described. The bottom of the bottle rests upon a support 8, which has a flange 9, adapted to engage with one side of the bottle. The support 8 has an integral finger 10, which passes through a slot 11 in the bottle-supporting arm 4, so that it may freely move toward or away from the arm and clamp the bottle between the arm 4 and flange 9. This finger works in the slot and prevents twisting of the support and gives to it the required rigidity. As shown in Fig. 17, the arm 4 and flange 9 are curved to the general outline of the bottle, so that the latter may be tightly clamped against the arm 4. In order to move the support 8 to cause it to clamp the bottle in place, it is provided with a depending portion 12, which is adjustably secured to a base-supporting arm 13 by means of a set-screw 14. The arm 13 has bifurcated ends (see Fig. 17) which are journaled upon the shaft 5. A spring 15, surrounding the shaft 5 and engaging with the frame 1 and arm 13, constantly tends to elevate the latter. The arm 13 is provided with a depending portion 16. (Shown in dotted lines in Fig. 1.) This depending portion is provided with adjustable bolts 17, which may engage with abutments 18, formed upon the frames 1, when the parts are in the position shown in Fig. 1. When the parts are in that position, with the bolts 17 engaging with the abutments 18, the arm 13 and with it the support 8 will be moved away from the bottle and unlock the latter. A fresh bottle being placed upon the arm 4 and resting upon the base 8, as the link 7 is elevated and the arm 4 rocked upon its pivot the bolts 17 will disengage from the abutments 18, allowing the spring 15 to move the arm 13 toward the arm 4, thus clamping the bottle between the arm 4 and the flange 9. The adjusting-screw 14 in conjunction with the slot 11 allows the support 8 to be elevated to suit different-size bottles. This locking device permits the bottle to be swung from the position shown in Fig. 3 to that in Fig. 4, so that it will be in the path of movement of the label-applying and tin-foil-attaching device.

*The tin-foil holding and delivering device.*— This device consists of a reciprocating table 19, mounted to slide in ways 20, formed in the side pieces 1 1. These ways are substantially at right angles to the plane of the axis of the bottle when the latter is in the position shown in Fig. 4 and are arranged somewhat beyond the neck of the bottle when the latter is in the lowered position. (See Fig. 4.) The table 19 is supported upon a rod 21, which passes through a tubular support 22. Surrounding the rod 21 is a sleeve 23, which is actuated by a lever 24 by mechanism which will be described. Surrounding the rod 21 and between the sleeve 23 and the table 19 is a spiral spring 25, the sleeve 23 being otherwise free to slide upon the rod 21. The spring is connected with the sleeve 23 and table 19, respectively, so that when the sleeve is moved upward it will elevate the rod 21 and table 19 unless elevation of the latter is opposed, when the spring 25 will be compressed. The table 19 is provided with a series of cylindrical and concentrically-arranged openings similar to those shown in Fig. 10, such openings being for the purpose of holding the pin-supports 26, which retain the pile of circular pieces of tin-foil 27 in place upon the table. The arrangement shown in Fig. 10 permits different diameters of tin-foil to be used, and, if desired, instead of foil, oblong or oval labels may be used in place thereof, as shown in dotted lines in Fig. 2, the pins 26 being then suitably adjusted. These labels form the so-called "seal" for the cork or stopper and are particularly applicable where the "Crown system" of stopperage is used. The idea of using mechanism which may be used with tin-foil or labels for covering the corks of bottles I consider to be of importance.

*The label holding and delivering device.*— This device consists of a table 28, similar to the table 19, but sufficiently large to hold body-labels 29 and neck-labels 30. These labels are held in place by suitable clamps 31 32, so that the pile of labels will not become disarranged. These clamps are adjustably secured to the table to permit different-sized labels to be used. The table 28 is supported by a rod 33, similar to the rod 21, and such rod is provided with a sleeve 34 and spring 35, similar to the sleeve and spring described in connection with the rod 21. The table is immediately below the bottle and the distance that the labels move through is very short, so there is but slight chance of their being blown away or lost. The sleeve 34 is elevated by the lever 36, which is actuated by mechanism which will be described. The table 28 slides within guides 37, cut in the side pieces 1 1. Suitable mechanism is provided for elevating the tin-foil and label-carrying tables, so that they will be elevated to be in position for engagement with the pick-up devices.

*The paste-applying device.*—This device consists of a receptacle 38, arranged to be reciprocated in a slot 39, cut in the side pieces 1 1, so that it will be moved from the position shown in Fig. 2 over both the label and tin-foil tables. The receptacle 38 is so arranged as to hold a quantity of liquid or semiliquid paste and is provided with rollers 40 and 41 in engagement, as shown, the roller 40 dipping into the paste within the receptacle 38. These rollers are made of suitable material, so that the upper roller 40 will be always coated with a sufficient amount of paste for application to the pick-up devices. The receptacle 38 is actuated by levers 42, which are arranged outside of the frame and pivoted by means of the slots 43 to pins 44. Means hereinafter described is provided for reciprocating the levers 42, so that the paste-applying device will be moved the full length of the slot 39 and return, depositing a layer of paste upon both of the pick-up devices. The slots 43 are necessary, as the upper ends of the levers 42 move in a straight line and not in the arc of a circle.

*The tin-foil pick-up and transferring device.*—This device consists of a plate 45, (see Figs. 3 and 10,) provided with circularly-arranged openings 46 for the passage of the pins 26 on the table 19 when the latter comes to engage with the plate. These openings facilitate the stripping of the tin-foil from the plate, as they greatly diminish the contact-surface and eliminate an otherwise undesirable adhesive tendency. The plate is also provided with a central opening 47, somewhat larger than the neck of the bottle. This plate is provided with fingers 48, which move within ways 49, formed in the side pieces 1 1, such ways being parallel to the slot 39. The other end of the plate 45 is provided with fingers 50, which engage with slots 51, formed within the carriage 52. This carriage 52 is provided with slides 53, which work within the slot 49. Each of the slots 51 is curved at 54 at its lower end, so that the plate 45 can assume the position shown in Fig. 3 when the carriage 52 is in the position shown in that figure, or it may be moved to a position at right angles, as shown in Fig. 4, when the carriage is moved toward the bottle, the fingers 50 riding up in the slot 51 and causing the plate to fulcrum upon the fingers 48 as pivots. These fingers and slots also serve the purpose of keeping the plate 45 in position when the pile of tin-foil is pressed against it by the ascending table 19. A stop 55, arranged within the slot 49, limits the backward movement of the plate 45, yet permits it to be moved toward the bottle, a spring 56 opposing such movement. The other extremity of the spring 56 is secured to a finger 57, such finger being secured to the side frame. (See Fig. 10.) In order to make the plate move smoothly, a spring 56 is preferably attached to each side, as shown. While in the position shown in Fig. 3 the plate 45 will be parallel to the slot 39 and in such a position that it will be engaged by the upper roller 41 of the paste-applying device when the latter is reciprocated below it. The plate may then be moved at a right angle, as shown in Fig. 4, by the movement of the carriage 52, the springs 56 opposing such movement and causing the fingers 50 to ride up in the slots 51, a layer of tin-foil having been applied to the lower face of the plate by the elevation of the table 19.

*The labeling pick-up device.*—This device is best shown in Figs. 1, 2, and 7. Two plates 58, so arranged that the opening between them will be substantially the shape of the body and neck of a bottle, (see Fig. 2,) are each supported upon a frame 59, which frame works within ways 60 60, formed in the side pieces 1 1. The frames 59 59 are simultaneously reciprocated by links 61, arranged on the outside of each, by mechanism which will be described, in such a manner that after the plates 58 are engaged by the paste-applying device they will be engaged by the uppermost label in the label-applying device and will then be elevated, so that a plate 58 will pass on each side of the bottle, engaging the middle of the label with the bottle and transferring the label from the plates 58 thereto. The plates 58 are provided with slots 62, which engage with bolts 63, formed on the frame 59, by means of which they may be adjusted toward and away from each other to accommodate different sizes of bottles.

*The compressing device.*—This device consists of a conical chamber 64, secured to the carriage 52 and moving therewith. The chamber is in engagement with a plate 65, the latter having an opening 66 in the center thereof for entrace of the neck of the bottle. The chamber is removably secured to the plate by being provided with ears 67, through which bolts 68 pass, the said bolts engaging with the plate 65. This plate serves as a base or support to the sides of the carriage and serves to assist in folding the tin-foil around the neck of the bottle as it is advanced toward the bottle and also serves as a guard to prevent the rupturing of the rubber diaphragm about to be described. A diaphragm of rubber or other elastic material 69 surrounds the larger end of the chamber 64 and is in engagement with the plate 65. This diaphragm is removably secured in place by means of a gasket 70, which gasket may be conveniently formed of a rubber band. Connected to the chamber 64 is a hollow piston-rod 71, which passes into a cylinder 72 and is connected to a piston 73, moving therein. The lower end of the cylinder is closed by a head 74, provided with a stuffing-box 75, the other end of the cylinder being open. The end of the piston-rod 71 after passing through the piston is also open. The chamber 64, being connected to the carriage 52, will move therewith, the piston and piston-rod sliding within the cylinder, and air will be compressed within the cylinder and be forced at a considerable pressure at the proper time into the chamber 64 when the latter has surrounded the neck of the bottle. The control of the air-pressure is by means of mechanism which will be described. The cylinder is supported upon trunnions 76, which are journaled upon an extension 77 on the frame 1 1, so that the cylinder may be turned from the angular position shown in Fig. 1 to the position shown in Fig. 16 for the purpose of removing or repairing the diaphragm 69, the bolts 68 being removed to permit this to be done.

*The compressor.*—The compressor is controlled by means of a valve 78, which works within the hollow rod 71. This valve is connected to a rod 79, provided with an enlarged head 80, the said head being within the chamber 64 and in such a position that it will be engaged by the cork or stopper of the bottle when the chamber is moved in that direction. A spring 81 tends to move the head 80 toward the diaphragm and exposes a port 82 within the tube 71. As shown in Fig. 5, the port 82 is uncovered, and, as indicated, the portion of the cylinder below the piston 73 is open to the atmosphere. After the head 80 has engaged with the cork of the bottle and the chamber 64 is moved to such a position that the spring 81 is compressed, as shown in Fig. 6, the port 82 will be first covered and then opened below the valve 78, permitting communication between the inside of the cylinder and the chamber 64, the length of the valve 78 determining the closed period of the port and controlling the amount of pressure within the cylinder before the latter is opened to communication with the chamber 64. This air device is for the purpose of engaging the rubber diaphragm with the neck of the bottle and snugly and tightly compressing the tin-foil thereon, as will be described in connection with the operation of the machine.

*The wiping or smoothing device for the labels.*—This device is illustrated in Figs. 7, 8, and 9. It consists of a pair of brushes 83 83, formed of any suitable material—such as rubber, felt, or bristles—and each is of the shape substantially of the plates 58 58. (Shown in Fig. 2.) It may be found advisable to use bristles on that portion of the brushes which comes directly in contact with the neck of the bottle, as this portion of the brushes must be so made as to readily conform to the shape of the bottle. Each of the brushes or wipers 83 is clamped between plates 84 85 by screws 86; so that they may be removed or adjusted. The plates 84 are attached to or formed integrally with arms 87, pivoted at 88 to the moving frame 59 of the label pick-up, so that it will move simultaneously therewith. Mechanism is provided for moving the brushes from the position clear of the bottle (shown in Fig. 7) to the position shown in Fig. 9, where they are engaged with a label which has been picked up and applied to the bottle. This mechanism consists of a pin 89, which engages with a fixed box-cam 90, formed within a plate 91, secured to a side piece 1 1, adjacent to the slide 60. The pin is arranged to rotate in suitable bearings, so that friction will be reduced. The cam 90 is provided with parallel vertical portions 92 93 and an inclined bottom portion 94 and inclined top 95, the top being slightly curved inward, as shown. The cam 90 being fixed and the pin 89, which is carried by the arm 87, moving, the pin is caused to travel in the cam 90, passing upward to the portion 92, across the curved portion 95, and downward to the vertical portion 93 and again inward across the inclined portion 94. To cause this to be done, the arms 87 are normally held outward by means of springs 96, which are supported by arms 97, carried by the frame 59. The cam-groove 93 is of the depth of the other grooves at the top; but its bottom is inclined, as shown at 98, Fig. 8, so that it becomes gradually shallower, disappearing entirely at the bottom. By this construction the pin 69 will be compelled to follow the inclined portion 94 and the arm 87 will be properly moved. The pin 89 is arranged to move within an opening in the arm 87 and is kept in engagement with the cam by means of a spring 99, a stem 100, passing through a guide 101, holding it in position, the pin 89 being always held in engagement with the bottom of the cam 90 when the frame is being lowered from the position shown in broken lines in Fig. 9. This mechanism is of course duplicated upon the other side of the machine, so that the two wipers will operate simultaneously.

*The cam-operating mechanism.*—The main actuating-cam 102 is supported upon a shaft 103. This shaft is rotated by means of a clutch-pulley, (not shown,) which may be thrown into and out of action by means of a lever 102' and pedal 102". It is not necessary to illustrate this clutch-pulley, as any form of pulley or any other well-known device may be used for rotating the shaft 103. The cam 102 is provided with cam-grooves 104 and 105. The cam-groove 104 engages with a pin 106, carried by the arm 24, for reciprocating the latter. The groove 105 engages with a pin 107, carried by the arm 36, for reciprocating the latter. This groove is also engaged by a pin 108, carried by a bell-crank lever 109. This lever carries a link 110, which has a bifurcated end 111, which is pivoted at 112 to the carriage 52, which is thereby reciprocated. The shape of the cam-groove 105 is such that the levers 36 and 109 will be actuated to move their mechanism at the proper time. The periphery of the cam 102 is provided with a notch 113, which is adapted to engage with a hook 114, pivoted at 115 to the arms 42. A spring 116 keeps the hook 114 in engagement with the periphery of the cam and causes it to engage with the notch 113 at the proper time. The end of the hook is rounded, as shown, so that it will become disengaged from the notch when elevated to the position shown in broken lines in Fig. 14 by a portion of its arm coming into contact with the periphery of the cam. The bell-crank lever 109 is supported upon a suitable shaft 117, secured to the side pieces 1 1. The cam is also provided with a pin 136ª, which is adapted to engage with a projecting lever 137, such lever being connected to the link 61. These parts are so adjusted that the link may be moved from the position shown in solid lines in Fig. 14 to that shown in dotted lines by the engagement of the pin with the lever.

*The throw-off device.*—This device is illustrated in Figs. 1, 11, 12, and 13 and is for the purpose of preventing the elevation of either the label-carrying table or the tin-foil-carrying table, or both, so that they will not be engaged with the pick-up device. This is for the purpose of allowing the machine to be started and the pick-up device engaged a number of times with the paste-applying device before the labels are brought into action analogous to the "limbering-up" action in the operation of a printing-press and is also of use in disconnecting the label-applying device or the tin-foil-applying device without stopping the machine. It is also useful in case a label or sheet of tin-foil is misplaced, as the operator can very quickly grasp the handle of the throw-off device and correct the error without a further waste of time or material. This mechanism consists of a stop 118, working within a slot 119 (see Fig. 12) in such a position that it may become engaged with a projection 120 on the label-supporting table 28, (see Fig. 7,) holding the latter in such a depressed position that the labels will not be engaged with the pick-up device. A similar stop 121, working within a slot 122, is adapted to be engaged by a projection 123 on the tin-foil table 19. These stops 118 and 121 are each connected to a link 124 and 125, respectively. These links are pivoted to projections 126 and 127 on a lever 128, which lever is pivoted at 129 in a slot 130. Springs 131 and 132 tend to move the lever 128 to the position shown in Fig. 11. The lever may be moved against the tension of the springs until its projecting portion 133 is caused to engage with a notch 134, as shown in Fig. 13, thus causing the stops 118 121 to engage with the tables 19 and 28, as shown in Fig. 13. Additional notches 135 136 above and below the notch 134 permit the lever 128 to be turned upon its pivot 129 and move either one of the plates 118 and 121, so as to lock out whichever table is desired, it being remembered that the tables are elevated through the agency of the spiral springs 25 and 35, which will be compressed when the tables are locked out.

*The operation.*—A supply of labels 29 and 30 is applied to the table 28, such labels being arranged with the printed side down. Circular sheets of tin-foil 26 are applied to the table 19, or in lieu of tin-foil cork labels for making the so-called "seal" may be substituted, the pins 26 being suitably adjusted to hold the pile in position. The receptacle 38 is filled with paste and the lock-out device arranged in the position shown in Fig. 13, so that the tables 19 and 28 cannot be elevated. The machine is then started. The cam 102 will be rotated in the direction of the arrow, as shown in Fig. 14, and the hook 114 will engage with the notch 113. The hook, together with the levers 42, will be moved to the position shown in dotted lines in Fig. 14, and it will be immediately released, allowing the levers to drop back by gravity. This movement will be very rapid and will cause the paste-applying device to move under the pick-up plates 58 and the perforated plate 45, applying paste to both. This movement may be kept up for a few moments until the plates are properly covered with paste, and the lock-out device may then be disconnected and moved to the position shown in Fig. 12, which will allow the tables to be elevated. A bottle is now applied to the arm 4 and rests upon the base 8. As soon as the cam 102 moves from the position shown in Fig. 1 for about a quarter of a revolution engagement with the pin 106 with the cam-groove 104 will oscillate the lever 24, elevate the link 7, and oscillate the support 4 through about ninety degrees of the arc of a circle. As soon as the bolt 17 ceases to engage with the abutment 18 the spring 15 will force the flange 9 in engagement with the bottle and lock the bottle in position against the arm 4. The bottle will be in the position shown in Fig. 4 and will stay in that position until the tin-foil and labels are applied. The pins 106 and 107, carried by the arms 24 and 36, respectively, engaging with the cams 104 and 105, will next elevate the levers 24 and 36 and with the levers, the sleeves 23 and 34 elevating the tables 19 and 28 and causing the uppermost layer of tin-foil and uppermost label to engage with the pick-up devices. The springs 25 and 35 allow the tin-foil and labels to always engage with the pick-up device. When the tables are filled with a package of tin-foil and labels, the springs will be compressed to the maximum point, and when the tables are nearly empty the springs will be very slightly compressed. A pile of tin-foil is first moved up against the plate 45, (see Fig. 3,) the bottom surface of the latter being covered with paste, which will stick to the uppermost layer of tin-foil and pick such layer up. At this point the pin 108, which is in the groove 105, engages with the flattened portion of the cam and oscillates the bell-crank lever 109, pushing forward the link 110 and with it the carriage 52. The left-hand end of the plate 45 being held in engagement with the stops 55 by the springs 56 will cause the fingers 50 to engage with the curved portions 54 of the slot 51, elevating the plate 45 (by the movement of the carriage) and with it the uppermost sheet of tin-foil. By the time the carriage 52 is in the position shown in Fig. 4 the plate 45 will be at right angles to its former position and the sheet of tin-foil will be between the plate 45 and the plate 65. The continual motion of the carriage 52 will cause the plates 45 and 65 to pass beyond the head of the bottle, the neck thereof passing through the openings 47 and 66. The tin-foil will be first engaged at its center with the cork or stopper of the bottle and will then be stripped off of the plate 45, the paste-covered side being toward the neck of the bottle. It is important that the neck of the bottle should enter the openings 47 and 66 a certain and definite distance. This is accomplished by adjustment of the support 8 and rod 12. As shown in Figs. 5 and 6, after the plate 45 has passed some distance beyond the top of the bottle the diaphragm 69 will be brought into engagement with the foil, and both will be flexed, as shown in Figs. 5 and 6, Fig. 6 illustrating in dotted lines the position that the diaphragm will assume before the air-pressure has acted upon it. At the time the carriage 52 is moving toward the bottle the piston 73 will pass through the cylinder 72 and air contained below the piston will pass through the port 82 until the head 80 comes in engagement with the cork of the bottle. This will arrest the movement of the valve 78 and cause the port 82 to be covered by it. Air will be then compressed below the piston 73, and when the parts are in the position shown in Fig. 6 the port 82 will be again exposed, permitting the air under pressure to pass through the tube 71 into the chamber 64. This air-pressure will move the diaphragm to the position shown in solid lines in Fig. 6 and will firmly and evenly hold the tin-foil around the neck of the bottle, filling in all irregularities therein. The amount and duration of the air-pressure can be varied by adjusting the length of the valve-rod 79 and the size of the valve 78. After the tin-foil has been applied the pin 108 will pass beyond the center of the cam 105 and move the bell-crank lever 109 to its original position, thus withdrawing the carriage 52 from the neck of the bottle and allowing the plate 45 to assume the position shown in Fig. 3. A label being attached to the paste-covered pick-up plates 58, the latter, with their carriage 59, will be elevated by the engagement of the pin 136ª with the lever 137. The bottle having the tin-foil affixed and being in the position shown in Fig. 9, the pick-up plates 58 will pass on each side thereof, causing the label to engage with the lower side of the bottle and be stripped off of the pick-up plates. This action will be facilitated by the wipers 83 83, which, as already described, will engage with the label during the ascending movement of the carriage 59 and will smoothly apply the label to the bottle, removing all wrinkles. It is to be noted that only the outer edges of the label engage with the pick-up device. Therefore only these parts of the label are covered with paste, and the amount of paste therefore necessary is reduced to a minimum. At the time the pick-up device 58 is operating the tin-foil-pick-up plate 45 having been relieved of its sheet of tin-foil and moved away from the bottle-neck is lowered to the position shown in Figs. 2 and 3 to receive a new tin-foil sheet, when the carriage 19 is again elevated. At the same time the carriage 59 will be lowered and the link 7 moved downward, elevating the tin-foiled and label-covered bottle to the position shown in Fig. 1. The lock therefore will then be released by engagement of the bolt 17 with the abutment 18. As soon as the bottles leave the machine they are ready for packing, and further handling is unnecessary. The covered bottle may be removed and a fresh one substituted. Thereupon the cycle of operations will again take place.

It will be understood that the parts of the machine are so proportioned that the tin-foils are applied to the bottles before the labels, so that the neck-labels (when used) may overlap the lower part of the tin-foil cap.

Instead of using air for pressing the tin-foil around the neck of the bottle water or other fluid may be employed by suitably proportioning the necessary parts of the mechanism.

Before claiming my invention I desire it understood that I do not desire to be limited to the exact structure shown, as the described machine is solely for the purpose of illustration.

Furthermore, I do not wish to be limited to the use of tin-foil, as other material may be employed.

Having now described my invention, what I claim, and desire to secure by Letters Patent, is—

1. In a machine of the character described, the combination of means for pivotally supporting the bottle, means for applying labels to the sides of the bottle, and means for applying coverings to the stopper.

2. In a machine of the character described, the combination of means for pivotally supporting the bottle, means for applying labels to the sides of the bottle, and means for applying tin-foil or labels to the stopper, such means operating without substantial change upon tin-foil or labels.

3. In a machine of the character described, the combination with means for pivotally supporting the bottle, and means for applying tin-foil to the stopper, such means acting upon the tin-foil in detached sheets.

4. In a machine of the character described, the combination with means for supporting the bottle, and means for applying tin-foil to the stopper and around the neck of the bottle, such means causing the tin-foil to envelop the neck of the bottle, and arranged to act upon the tin-foil in detached sheets.

5. In a machine of the character described, the combination with means for pivotally supporting the bottle, and means for applying a covering to the stopper, such means operating without substantial change upon tin-foil or upon labels.

6. In a machine of the character described, the combination with means for pivotally supporting the bottle, and means for applying a covering to the stopper, such means operating without substantial change upon coverings of different shapes and sizes.

7. In a machine of the character described, the combination with means for supporting the bottle, and means for applying a covering to the stopper and around the neck of the bottle, such means causing the covering to envelop the neck of the bottle, and being operated without substantial change upon coverings of different shapes and sizes.

8. In a machine of the character described, the combination with means for adjusting the covering for the stopper of the bottle, of means actuated by air-pressure to force the covering into engagement with the bottle and stopper.

9. In a machine of the character described, the combination with a pivoted support for the bottle, means for applying labels to the bottle, and means for oscillating and swinging the said support into the sphere of action of the label-applying device and out of such sphere of action, and a lock for holding the bottle to the support.

10. In a machine of the character described, the combination with a pivoted support for the bottle, means for applying labels to the bottle, and means for oscillating and swinging the said support into the sphere of action of the label-applying device and out of such sphere of action, and a lock for holding the bottle to the support, such lock being actuated by the means for swinging the support.

11. In a machine of the character described, the combination with a support for the bottle, and means for applying labels to the bottle, the said support being capable of swinging into the sphere of action of the label-applying device and out of such sphere of action, means for swinging the support, means for locking the bottle to the support and means for adjusting the support to fit different sizes and shapes of bottles.

12. In a machine of the character described, the combination with a support for the bottle, of means for supplying labels to the bottle, the said support being capable of swinging into the sphere of action of the label-applying devices and out of such sphere of action, means for swinging the support, means for automatically locking the bottle to the support, and means for adjusting the support to fit bottles of different lengths and diameters.

13. In a machine of the character described, the combination with a frame, of a bottle-support pivoted thereon, the said support comprising an arm and a base-support, the said base-support having a flange and means for clamping the bottle between the arm and flange.

14. In a machine of the character described, the combination with a frame, of a bottle-support pivoted thereon, the said support comprising an arm and a base-support, the said base-support having a flange, the said base-support being adjustable in relation to the arm, and means for clamping the bottle between the arm and flange.

15. In a machine of the character described, the combination with a frame, of a bottle-support pivoted thereon, the said support comprising an arm and a base-support, the said base-support having a flange, the said base-support being adjustable in relation to the pivoting-point of the arm and means for clamping the bottle between the arm and flange.

16. In a machine of the character described, the combination with a frame, of a bottle-support pivoted thereon, the said support comprising an arm and a base-support, the said base-support having a flange, and the said base-support being adjustable both in relation to the arm and to the pivoting-support of the arm.

17. In a machine of the character described, the combination with a frame, of a bottle-supporting arm, and a base-support pivoted thereon, and means for changing the angular relation between the arm and base-support for clamping the bottle.

18. In a machine of the character described, the combination with a frame, of a bottle-support which comprises an arm and a base-support pivoted thereon, and means for changing the angular relation between the arm and base-support for clamping the bottle, and means for unclamping the bottle such means acting by the movement of the support.

19. In a machine of the character described, the combination with a frame, of a support which comprises an arm and a base-support pivoted to the frame, the said arm having a lever to which the operating mechanism is connected, a spring for moving the arm and base-support to clamp the bottle, and a fixed abutment arranged in the path of movement of the base-support for changing the angular relation of the arm and base-support and locking the bottle.

20. In a machine of the character described, the combination with a frame, of a bottle-support which comprises an arm and a base-support pivoted to the frame, the said arm having a lever to which the operating mechanism is connected, a spring for causing the lever and base-support to lock the bottle, and a fixed abutment arranged in the path of movement of the base-support for changing the angular relation of the arm and base-support and unlocking the bottle, the said bottle being disengaged from the support by means of a movement of the latter.

21. In a machine of the character described, the combination with a frame, of a bottle-support which comprises an arm and a base-support pivoted to the frame, the said arm having a lever to which the operating mechanism is connected, a spring for causing the arm and base-support to lock the bottle, a bolt on the base-support, and a fixed abutment arranged in the path of movement of the bolt for changing the angular relation of the arm and base-support and unlocking the bottle.

22. In a machine of the character described, the combination with a frame, a movable, pivoted support for the bottle and means for locking the bottle to the support, of a label-table, a pick-up device, and a paste-applying device, means for engaging the paste-applying device with the pick-up device and means for moving the pick-up device in position to cause the label to adhere to the bottle, and a wiper carried by the pick-up device.

23. In a machine of the character described, the combination with ways a pick-up device reciprocating therein, of means for reciprocating the pick-up device in relation to the bottle, means for adjusting the pick-up device, and a wiper carried upon the pick-up device, the said wiper being pivotally mounted.

24. In a machine of the character described, the combination with a frame, of a rising and falling reciprocating and adjustable pick-up device and a pivoted wiper carried thereon, and means on the frame for moving the wiper to engage with the bottle.

25. In a machine of the character described, the combination with a frame, of a pick-up for applying labels to the bottle, the said pick-up sliding in the frame and reciprocating in relation to the bottle and means for adjusting said label-applying means, and a wiper, and means carried by the frame for causing the wiper to engage with the bottle.

26. In a machine of the character described, the combination with a frame and an adjustable pick-up sliding therein, of a wiper carried on the pick-up, a cam on the frame, the said cam controlling the movements of the wiper.

27. In a machine of the character described, the combination with a frame, of a member sliding therein, an adjustable plate carried by said member, a wiper pivoted upon said sliding member, and a fixed cam for controlling the movement of the wiper.

28. In a machine of the character described, the combination with a frame, of an element sliding thereon, the said element carrying an adjustable plate, a wiper pivoted to the element, a fixed cam on the frame, and means engaging with the cam for controlling the movements of the wiper.

29. In a machine of the character described, the combination with a frame, of a wiper movable thereon, the said wiper being pivoted, means carried by the wiper for causing the wiper to swing toward and engage with the bottle, a fixed cam on the frame for actuating said means, and a spring for causing the wiper to disengage and swing away from the bottle.

30. In a machine of the character described, the combination with a frame, of a wiper movable thereon, the said wiper being pivoted, a fixed cam on the frame, and a pin carried by the wiper and engaging with the cam for causing the wiper to swing toward and engage with the bottle and a spring to cause the wiper to disengage and swing away from the bottle.

31. In a machine of the character described, the combination with a pivoted wiper, having a pin, of a cam, the said cam having two straight parallel grooves, and an inclined groove, one of said straight grooves being of varying depth.

32. In a machine of the character described, the combination with a pivoted wiper, and a cam, of a pin on the wiper engaging with the cam, the groove in the cam being of varying depth, and means for causing the pin to engage with the bottom of the cam-groove.

33. In a machine of the character described, the combination with a pick-up frame, of pick-up plates adjustably secured thereto, said plates being shaped to conform to the shape of the bottle.

34. In a machine of the character described, the combination with means for supporting a bottle, of label and tin-foil carrying tables, means for elevating and depressing the tables, and means for locking the said tables against operative movement.

35. In a machine of the character described, the combination with means for supporting a bottle, of label and tin-foil carrying-tables, means for elevating and depressing the tables, and means for locking the said tables against operative movement, the said means being disengageable at will.

36. In a machine of the character described, the combination with a frame, of pick-ups thereon, label-supporting tables, and means for moving the tables to bring the labels in contact with the pick-ups, and means for locking out the tables and preventing the labels from engaging with the pick-ups.

37. In a machine of the character described, the combination with a support for the bottle, a support for the stopper-covering, and a pivoted and longitudinally-movable pick-up for the stopper-covering.

38. In a machine of the character described, the combination with a frame, of means for supporting a bottle therein, a stopper-covering support, a pick-up therefor, means for moving the covering into engagement with the pick-up, and means for pivotally and longitudinally moving the pick-up to engage with the bottle.

39. In a machine of the character described, the combination with a frame, of means for supporting a bottle therein, a stopper-covering support, means for moving the stopper-covering support in a plane substantially at right angles to the longitudinal axis of the bottle, a pick-up, said pick-up being in the path of the stopper-covering support, and means for pivotally and longitudinally moving the pick-up to cause the covering to engage with the neck of the bottle.

40. In a machine of the character described, the combination with a frame, means for supporting a bottle therein, means for supporting a stopper-covering, means for moving the support in a path substantially at right angles to the longitudinal axis of the bottle, a pick-up, a carriage for supporting the pick-up, means for moving the carriage in a plane at right angles to the path of movement of the stopper-covering support, and means for pivotally and longitudinally moving the pick-up.

41. In a machine of the character described, the combination with a frame, of means for supporting a bottle therein, a carriage, the said carriage having a plate with an opening therein, means for moving the carriage to cause the neck of the bottle to pass through the opening, and means for supporting the stopper-covering adjacent to the opening.

42. In a machine of the character described, the combination with a frame, of means for supporting a bottle therein, means for supporting the stopper-covering, a reciprocating carriage, a pivoted pick-up, and means actuated by a movement of the carriage for swinging the pick-up and bodily moving it into engagement with the bottle.

43. In a machine of the character described, the combination with a frame, of means for supporting a bottle therein, a carriage, a pick-up, the said pick-up being supported between the frame and carriage in such a manner that it will be first tilted and then longitudinally moved by the carriage.

44. In a machine of the character described, the combination with a frame, of means for supporting a bottle therein, means for supporting a stopper-covering, a carriage, means for moving the carriage, a pick-up supported between the frame and the carriage, and means for causing the pick-up to engage with the stopper-covering, and tilt upon the carriage, and be bodily moved in engagement with the bottle.

45. In a machine of the character described, the combination with a frame, of means for supporting a bottle therein, a stopper-covering table working therein in a plane at right angles to the axis of the bottle, a carriage moving at right angles to the table, and a pick-up supported between the carriage and the frame in such a manner that a stopper-covering will be engaged by the pick-up and upon movement of the carriage, it will be turned at an angle and then bodily moved to engage with the bottle.

46. In a machine of the character described, the combination with a frame, of means for supporting a bottle therein, a table for supporting the stopper-covering, the said table moving in a path at right angles to the longitudinal axis of the bottle, a carriage moving at right angles to the path of movement of the table, a pick-up thereon, means for gumming the pick-up, means for engaging a stopper-covering with the pick-up, and means for turning the pick-up at right angles and moving it into engagement with the bottle.

47. In a machine of the character described, the combination with a frame, means for supporting the bottle therein, a carriage, means for supporting the stopper covering in engagement with the carriage, a pick-up device within the frame, ways within the carriage and fingers on the pick-up engaging with the ways, and a stop and spring on the pick-up, for retaining one end of the pick-up until it is turned at a right angle by the movement of the carriage.

48. In a machine of the character described, the combination with a frame, of a carriage operating therein, ways on the carriage, the said ways having a curved portion, ways on the frame, at right angles to the ways on the carriage, a pick-up having fingers thereon in engagement with the ways, a stop, and a spring for retaining one end of the pick-up until it is turned at a right angle by the movement of the carriage.

49. In a machine of the character described, the combination with a frame, of means for supporting a bottle therein, a pick-up for carrying a stopper-covering and a receiving-chamber for the bottle neck and covering, an elastic diaphragm between the pick-up and the chamber, and means for supplying air-pressure to the chamber.

50. In a machine of the character described, the combination with a frame, of a chamber having an elastic diaphragm therein, means for supplying air-pressure to the chamber, and means for supporting a stopper-covering adjacent to the diaphragm, and means for moving the covering into engagement with the bottle.

51. In a machine of the character described, the combination with a chamber, of an elastic diaphragm thereon, a pick-up for supporting a stopper-covering, means for operating the pick-up, and means for supplying air-pressure to the chamber.

52. In a machine of the character described, the combination with a chamber, of an elastic diaphragm thereon, means for supplying air-pressure to the chamber, and means within the chamber for controlling the time and duration of the air-pressure.

53. In a machine of the character described, the combination with a chamber, of an elastic diaphragm therein, means for supplying air-pressure to the chamber, a valve for controlling the air-pressure, and means within the chamber for controlling the valve.

54. In a machine of the character described, the combination with a chamber, of an elastic diaphragm therein, means for supplying air-pressure to the chamber, a valve for controlling the air-pressure, the said valve having a stem which enters the chamber.

55. In a machine of the character described, the combination with a frame, of means for supporting a bottle therein, tables for supporting body-labels and stopper-coverings, pick-ups, and a paste-applying device adapted to travel between the tables and the pick-ups.

56. In a machine of the character described, the combination with a reciprocating carriage, having a plate thereon, of a chamber attachably secured thereto, and a diaphragm closing the chamber.

57. In a machine of the character described, the combination with a movable compressing-chamber, of a diaphragm and means for removably securing the diaphragm to the chamber.

58. In a machine of the character described, the combination with a movable compressing-chamber, of a plate removably secured thereto, and an elastic diaphragm between the chamber and plate.

59. In a machine of the character described, the combination with a frame, of a carriage sliding therein, a plate on the carriage, a cylinder pivotally mounted on the frame, a piston and piston-rod, a chamber carried by the carriage, connections between the chamber and piston-rod, and connections between the chamber and the plate whereby the chamber may be disconnected from the carriage and the cylinder swung upon its pivot.

60. In a machine of the character described, a pick-up, the said pick-up being perforated, and means for tilting and longitudinally moving the pick-up.

61. In a machine of the character described, the combination with a tin-foil table, and a pick-up both being provided with corresponding openings, and pins for confining the edges of the tin-foil, such pins being secured within the openings in the table and passing through openings in the pick-up.

62. In a machine of the character described, the combination with a frame, of a bottle-support thereon, the said support comprising a lock and means for swinging the bottle into and out of the sphere of action of the label-affixing mechanism, a label-table, a pick-up between the table and bottle, a paste-applying device, the said paste device moving in a path between the table and pick-up, and means for actuating the pick-up to affix the label.

63. In a machine of the character described, the combination with a frame, of a bottle-support thereon, the said support comprising a lock, and means for swinging the bottle into and out of the sphere of action of the label-affixing mechanism, a label-table, a pick-up between the table and bottle, a paste-applying device, the said paste device moving in a path between the table and pick-up, and means for actuating the pick-up to affix the label, and a wiper for the label.

64. In a machine of the character described, the combination with a frame, of a bottle-support thereon, the said support comprising a lock, and means for swinging the bottle into and out of the sphere of action of the label-affixing mechanism, a label-table, a pick-up between the table and bottle, a paste-applying device, the said paste device moving in a path between the table and pick-up, and means for actuating the pick-up to affix the label, and a wiper for the label, the said wiper being carried by the pick-up.

65. In a machine of the character described, the combination with a frame, of a bottle-support thereon, the said support comprising a lock, and means for swinging the bottle into and out of the sphere of action of the tin-foil-affixing mechanism, a foil-table, a pick-up for the foil, a paste device, the said device moving in a path between the table and pick-up, and means for actuating the pick-up to affix the tin-foil.

66. In a machine of the character described, the combination with a frame, of a bottle-support thereon, the said support comprising a lock, and means for swinging the bottle into and out of the sphere of action of the tin-foil-affixing mechanism, a foil-table, a pick-up for the foil, a paste device, the said device moving in a path between the table and pick-up, and means for actuating the pick-up to affix the tin-foil, and means for compressing the foil on the stopper.

67. In a machine of the character described, the combination with a frame, of a bottle-support thereon, the said support comprising a lock, and means for swinging the bottle into and out of the sphere of action of the tin-foil-affixing mechanism, a foil-table, a pick-up for the foil, a paste device, the said device moving in a path between the table and pick-up and means for actuating the pick-up to affix the tin-foil, and means for compressing the foil on the stopper, said means being independent of the pick-up.

68. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the table and pick-ups and means for actuating the pick-ups to affix the label and tin-foil.

69. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the tables and pick-ups and means for actuating the pick-ups to affix the label and tin-foil, and a wiper for the label.

70. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the tables and pick-ups, means for actuating the pick-ups to affix the label and tin-foil, and a wiper for the label, the said wiper being carried by the label pick-up.

71. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the tables and pick-ups, means for actuating the pick-ups to affix the label, and tin-foil, and means for compressing the foil on the stopper.

72. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the tables and pick-ups, means for actuating the pick-ups to affix the label and tin-foil, and means for compressing the foil on the stopper, the said means being operated independently of the foil pick-up.

73. In a machine of the character described, the combination with a frame, of a bottle-support thereon, the said support comprising a lock and means for swinging the bottle into and out of the sphere of action of the label and tin-foil affixing mechanism, a label-table, a pick-up between the table and bottle, a foil-table, a pick-up for the foil, a paste device, the said device moving in a path between the tables and pick-ups, means for actuating the pick-ups to affix the label and tin-foil, and means for compressing the foil on the stopper, the said means being operated independently of the foil pick-up, and a wiper for the labels.

74. In a machine of the character described, the combination with a frame, of a bottle-support thereon, the said support comprising a lock and means for swinging the bottle into and out of the sphere of action of the label and tin-foil affixing mechanism a label-table, a pick-up between the table and bottle, a foil-table, a pick-up for the foil, a paste device, the said device moving in a path between the tables and pick-ups, means for actuating the pick-ups to affix the label and tin-foil, and means for compressing the foil on the stopper, the said means being operated independently of the foil pick-up, and a wiper for the labels, the said wiper being carried by the label pick-up.

75. In a machine of the character described, the combination with a frame, means for supporting a bottle in the frame, reciprocating label-tables movable in the frame and labels carried by the tables, of a shaft, means actuated by the revolution of the shaft for reciprocating the tables, means for transferring the label from one table to the body of the bottle and means for transferring the label from another table to and over the stopper.

76. In a machine of the character described, the combination with a frame, means for supporting a bottle in the frame, a table carrying labels for the body of the bottle, a table carrying labels for the stopper, of a shaft, means actuated by the revolution of the shaft for reciprocating the tables, means actuated by the revolution of the shaft for delivering the label to the body of the bottle, and means actuated by the revolution of the shaft for delivering the label to the stopper.

77. In a machine of the character described, the combination with a frame, means for supporting a bottle in the frame, a table carrying labels for the body of the bottle, a table carrying labels for the stopper, of a shaft, means actuated by the revolution of the shaft for reciprocating the tables, means actuated by the revolution of the shaft for delivering the label to the body of the bottle, and means actuated by the revolution of the shaft for delivering the label to the stopper, and means actuated by the revolution of the shaft for causing the labels to adhere to the bottle and stopper.

78. In a machine of the character described, the combination with a frame, means for supporting a bottle in the frame, a table carrying labels for the body of the bottle, a table carrying labels for the stopper, of a shaft, means actuated by the revolution of the shaft for reciprocating the tables, means actuated by the revolution of the shaft for delivering the labels to the body of the bottle, and means actuated by the revolution of the shaft for delivering the labels to the stopper, and means actuated by the revolution of the shaft for applying the label to the bottle and stopper, and means actuated by the revolution of the shaft for oscillating and swinging the bottle out of the sphere of action of the label-applying devices.

79. In a machine of the character described, the combination with means for supporting the bottle, means for applying labels to the side of the bottle, means for applying coverings to the stopper and around the neck of the bottle, said means being actuated by air-pressure, and means for moving the bottle into the sphere of action of the label-applying device, and to return it to such sphere of action.

80. In a machine of the character described, the combination of mechanism for supporting the bottle, a label-carrying device, means for oscillating and swinging the bottle into the sphere of action of the said label-carrying device, and to return it from such sphere of action, means for applying a label to the body of the bottle, such means swinging into the sphere of action while applying the label and then out of such sphere of action, means for applying a label to the stopper and around the neck of the bottle, such mechanism being actuated by air-pressure and mechanism for actuating the body-label and stopper-label mechanism.

81. In a machine of the character described, the combination with a frame, of means for supporting a bottle thereon, a shaft, mechanism actuated by the revolution of the shaft for applying labels to the body of the bottle and mechanism for applying coverings to the stopper thereof.

82. In a machine of the character described, the combination with a frame, of means for supporting a bottle therein, such means acting to oscillate the bottle into and out of the sphere of action of the labeling mechanism, a shaft on the frame, and means actuated by the rotation of the shaft for oscillating the bottle.

83. In a machine of the character described, the combination with a frame, of a support for the bottle thereon, the said support being pivoted to the frame, a shaft within the frame, and means actuated by the rotation of the shaft for oscillating the bottle-support upon its pivot.

84. In a machine of the character described, the combination with a frame, of a pivoted bottle-support thereon, a shaft on the frame, a cam thereon, and connections between the cam and bottle-support for moving the latter upon its pivot.

85. In a machine of the character described, the combination with a frame, of a pivoted bottle-support thereon, a shaft on the frame, a cam on the shaft, a lever engaging with the cam, and connections between the lever and bottle-support for moving the latter.

86. In a machine of the character described, the combination with a frame, of a pivoted bottle-support thereon, a shaft, a cam on the shaft, a lever connected to the cam, and a connecting-rod connecting the lever and bottle-support for moving the latter.

87. In a machine of the character described, the combination with a frame, of a pivoted bottle-support thereon, and a tin-foil table, a shaft, and means actuated by the rotation of the shaft for simultaneously swinging the bottle-support and tin-foil table.

88. In a machine of the character described, the combination with a frame, of a support for the bottle, a label-table, a shaft, a cam thereon, and a spring and sliding-sleeve connections between the cam and the label-table for moving the latter.

89. In a machine of the character described, the combination with a frame, of a support for the bottle, a label-table, a shaft, a cam on the shaft, a lever in engagement with the cam, and a spring and sliding-sleeve connections between the lever and label-table for moving the latter.

90. In a machine of the character described, the combination with a frame, of a body-label table and a stopper-label table therein, a shaft, and connections between the shaft and tables for independently operating the latter.

91. In a machine of the character described, the combination with a frame, of a body-label table and a stopper-label table therein, a shaft, a cam thereon, and connections between the cam and tables for independently moving the latter.

92. In a machine of the character described, the combination with a label-table, and a tin-foil table, of a shaft, a cam thereon, levers engaging with the cam and connections between the levers and the tables for independently and yieldingly moving the latter.

93. In a machine of the character described, the combination with a frame, of a tin-foil table and a pick-up therefor, of a shaft, means actuated by the rotation of the shaft for independently moving the tin-foil table and the pick-up, and means for locking the table against movement.

94. In a machine of the character described, the combination with a frame, of a tin-foil table, and a pick-up therefor, a shaft, and a cam thereon, connections between the cam, and the tin-foil table, and connections between the cam and pick-up for moving the latter, and means for locking the table against movement.

95. In a machine of the character described, the combination with a frame, of a tin-foil table, and a pick-up therefor, said pick-up being supported in a carriage, of a shaft, separate means actuated by the rotation of the latter for moving the tin-foil table and the carriage, and means for locking the table against movement.

96. In a machine of the character described, the combination with a frame, of a tin-foil table, and a pick-up, the latter being supported by a carriage, a shaft, a cam thereon, connections between the cam and the carriage for moving the latter, connections between the cam and tin-foil table for moving the table, and means for locking the table against movement.

97. In a machine of the character described, the combination with a tin-foil table and a pick-up carriage, of a shaft, a cam thereon, the said cam having two grooves, connections between one groove and the pick-up carriage, and connections between the other groove and the tin-foil table.

98. In a machine of the character described, the combination with a tin-foil-pick-up carriage, and a label-table, of a shaft, a cam thereon, a groove in the cam, and means in engagement with the cam for actuating the tin-foil-pick-up carriage and the label-table.

99. In a machine of the character described, the combination with a frame, ways thereon, a paste reservoir and applying device movable in the ways, a paste-transferring device, and a label-carrying table, of a shaft, and means actuated by the revolution of the shaft for lowering the paste-transferring device, reciprocating the paste-applying device, raising the label-table, lowering the label-table and raising the paste-transferring device.

100. In a machine of the character described, the combination with a frame, ways thereon, a paste reservoir and applying device movable in the ways, a paste-transferring device, and a label-carrying table, of a shaft, and means actuated by the revolution of the shaft for lowering the paste-transferring device, reciprocating the paste-applying device, raising the label-table, lowering the label-table and raising the paste-transferring device, and a lock for preventing movement of the label-table.

101. In a machine of the character described, the combination with a frame, ways therein, a paste reservoir and applying device movable in the ways, a plurality of paste-transferring devices and a plurality of label-carrying tables, of a shaft, means actuated by the revolution of the shaft for moving the paste-transferring devices into position to receive the paste, means actuated by the revolution of the shaft for reciprocating the paste-applying device to apply paste to the transferring devices, means actuated by the revolution of the shaft for bringing the label-tables into position to deliver the labels to the transferring devices, and means actuated by the revolution of the shaft for separating the label-tables and the label-transferring devices.

102. In a machine of the character described, the combination with a frame, ways therein, a paste reservoir and applying device movable in the ways, a plurality of paste-transferring devices and a plurality of label-carrying tables, of a shaft, means actuated by the revolution of the shaft for moving the paste-transferring devices into position to receive the paste, means actuated by the revolution of the shaft for reciprocating the paste-applying device to apply paste to the transferring devices, means actuated by the revolution of the shaft for bringing the label-tables into position to deliver the labels to the transferring devices, and means actuated by the revolution of the shaft for separating the label-tables and the label-transferring devices, and locking devices for preventing movement of any or all of the label-tables.

103. In a machine of the character described, the combination with a paste-applying device, a lever for actuating the same, a shaft, a cam thereon, the said cam having a notch, and a hook connected to the lever and adapted to engage with the notch for reciprocating the lever.

104. In a machine of the character described, the combination with a paste-applying device, a lever connected thereto, the said lever having a slot, a pin on the frame engaging with the slot, a shaft, a cam thereon, the said cam having a notch, and a hook connected to the lever and engaging with the cam for oscillating the lever.

105. In a machine of the character described, the combination with a frame, of a moving table thereon, means for reciprocating the table, and a lock for preventing motion of the table.

106. In a machine of the character described, the combination with a frame, of a table therein, means for reciprocating the table, the said means being capable of being compressed and a lock for preventing motion of the table.

107. In a machine of the character described, the combination with a frame, of a reciprocating table therein, a lever for moving the table, a spring interposed between the lever and table, and a lock for preventing movement of the table said lock not affecting the movement of the lever.

108. In a machine of the character described, the combination with a plurality of reciprocating tables, means for moving the tables, and a lock for each table.

109. In a machine of the character described, the combination with a frame, of a plurality of tables therein, a lock for each table, a pivoted lever, and connections between the lever and locks for actuating the locks.

110. In a machine of the character described, the combination with a plurality of moving tables, a lock for each table, a lever, the said lever having a moving pivot, connections between the lever and the locks, and means for supporting the lever in position to actuate one or more of the locks.

111. In a machine of the character described, the combination with a frame, means for supporting a bottle thereon, a label pick-up, a shaft, a disk on the shaft, a pin on the cam, a lever actuated by the pin, and connections between the lever and pick-up for moving the latter.

112. In a machine of the character described, the combination with a frame, of means for supporting a bottle thereon, a pick-up, a support therefor, acting at right angles to the bottle when the latter is in the position to receive the label and the said support moving in ways in the frame, and means for moving the support.

113. In a machine of the character described, the combination with a frame, of means for supporting a bottle thereon, a label pick-up, a supporting-frame therefor, the said frame moving in ways in the frame, and a wiper carried by such supporting-frame.

114. In a machine of the character described, the combination with a frame, of a rocking support for the bottle, means for rocking the support about a pivot, means for supplying labels, and a pick-up, the said pick-up being moved in sequence with the bottle-support.

115. In a machine of the character described, the combination with a frame, of a bottle-support therefor, the said bottle-support being pivoted, means for supplying labels and stopper-coverings, pick-ups for the labels and stopper-coverings, and means for moving the pick-ups in sequence with the bottle-support.

116. In a machine of the character described, the combination with a frame, of means for supporting a bottle thereon, means for supplying labels and stopper-coverings, pick-ups, a shaft, and means actuated by the rotation of the shaft for moving the bottle-support and pick-ups in the proper sequence.

117. In a machine of the character described, the combination with a frame, of a support for the bottle, label and stopper-covering pick-ups, a paste-applying device, a shaft, and means actuated by the rotation of the shaft for actuating the pick-ups, and paste-applying device in proper sequence.

118. In a machine of the character described, the combination with a frame, of means for supporting a bottle therein, means for supporting labels and stopper-coverings, pick-ups therefor, a paste-applying device, a shaft, a cam thereon, and connections between the cam and pick-ups and paste-applying device for moving them in proper sequence.

119. In a machine of the character described, the combination with a frame, of a pivoted bottle-support thereon, means for supporting labels and stopper-coverings, pick-ups therefor, a paste-applying device for the pick-ups, a shaft, and means actuated by the rotation of the shaft for actuating the pick-ups, paste-applying device, and bottle-support in proper sequence.

120. In a machine of the character described, the combination with a frame, of a pivoted bottle-support thereon, means for supporting labels and tin-foil, pick-ups therefor, a paste-applying device, a shaft, a cam thereon, and connections between the cam and pick-ups, the paste-applying device and the bottle-supporting device for moving them in proper sequence.

121. In a machine of the character described, the combination with a frame, of a bottle-support thereon, means for supporting labels and stopper-coverings, pick-ups, a paste-applying device, a compressor for the stopper-covering, and a shaft, and connections actuated by the rotation of the shaft for actuating the paste-applying device, the pick-ups, and the compressor in proper sequence.

122. In a machine of the character described, the combination with a frame, of a bottle-support thereon, supports for the labels and foil, pick-ups, a paste-applying device, and a compressor for the foil, a shaft, and a cam thereon, and connections between the cam and the pick-ups and paste-applying device and compressor for operating them in proper sequence.

123. In a machine of the character described, the combination with a frame, of a pivoted bottle-support thereon, label and tin-foil supports, pick-ups therefor, a paste-applying device for the pick-ups, a compressor for the foil, a shaft, and means actuated by the rotation of the shaft for moving the bottle-support, the pick-ups, the paste-applying device, and the compressor in proper sequence.

124. In a machine of the character described, the combination with a frame, of a pivoted bottle-support thereon, supports for the labels and foil, pick-ups therefor, a paste-applying device for the pick-ups, a compressor for the foil, a shaft in the frame, a cam thereon, and connections between the cam and the bottle-support, the pick-ups, the paste-applying device, and the compressor for moving them in the proper sequence.

125. In a machine of the character described, the combination with a frame, of means for supporting a bottle thereon, moving tables for supporting labels and stopper-coverings, pick-ups, a paste-applying device for the pick-ups, a shaft, and means actuated by the rotation of the shaft for moving the tables, the pick-ups, and paste-applying device in proper sequence.

126. In a machine of the character described, the combination with a frame, of means for supporting a bottle thereon, moving tables for supporting labels and foil, pick-ups, a paste-applying device for the pick-ups, a shaft, a cam thereon, and means actuated by the cam for operating the tables, the pick-ups, and the paste-applying device in proper sequence.

127. In a machine of the character described, the combination with a frame, of a pivoted bottle-support thereon, moving tables for the labels and stopper-coverings, pick-ups therefor, a paste-applying device, a shaft, and means actuated by the shaft for moving the bottle-support, the pick-ups, the tables and the paste-applying device in proper sequence.

128. In a machine of the character described, the combination with a frame, of a pivoted bottle-support thereon, moving tables for the labels and foil, pick-ups therefor, a paste-applying device for the pick-ups, a shaft, a cam thereon, and connections between the cam and bottle-support, pick-ups, tables, and paste-applying devices for moving them in proper sequence.

129. In a machine of the character described, the combination with a frame, of means for supporting a bottle therein, moving tables for the label and foil, pick-ups therefor, a paste-applying device for the pick-ups, and a compressor for the foil, a shaft, and means actuated by the rotation of the shaft for moving the pick-ups, the tables, the paste-applying device, and the compressor in proper sequence.

130. In a machine of the character described, the combination with a frame, of means for supporting a bottle therein, moving tables for the labels and stopper-coverings, pick-ups therefor, means for applying paste to the pick-ups, a compressor for the stopper-coverings, a shaft, a cam thereon, and connections between the cam and the tables, the pick-ups, the paste-applying device, and the compressor for moving them in proper sequence.

131. In a machine of the character described, the combination with a frame, of a bottle-support pivoted thereon, moving tables for the labels and foil, pick-ups therefor, a paste-applying device for the pick-ups, a compressor for the foil, a shaft, and means actuated by the rotation of the shaft for moving the bottle-support, the pick-ups, the tables, the paste-applying device, and the compressor in proper sequence.

132. In a machine of the character described, the combination with a frame, of a bottle-support pivoted thereon, moving tables for the labels and foil, pick-ups therefor, a paste-applying device for the pick-ups, compressor for the foil, a shaft, a cam thereon, and connections between the cam and the bottle-support, the pick-ups, the tables, the paste-applying device and the compressor for moving them in proper sequence.

133. In a machine of the character described, the combination with means for supporting a bottle, supports for the labels and stopper-coverings, pick-ups therefor, a paste-applying device, and means for moving the pick-ups and paste-applying device in proper sequence.

134. In a machine of the character described, the combination with a frame, of a pivoted bottle-support thereon, means for supporting labels and foil, pick-ups, a paste-applying device for the pick-ups, and means for moving the bottle-support, the pick-ups, and paste-applying device in proper sequence.

135. In a machine of the character described, the combination with a frame, means for supporting a bottle therein, means for supporting labels and stopper-coverings, pick-ups therefor, a paste-applying device, a compressor for the stopper-coverings, and means for actuating the pick-ups, the paste-applying device, and the compressor in proper sequence.

136. In a machine of the character described, the combination with a frame, of a bottle-supporting device pivoted thereon, supports for the label and foil, pick-ups therefor, a paste-applying device, a compressor, and means for moving the bottle-support, the pick-ups, the paste-applying device and the compressor in proper sequence.

137. In a machine of the character described, the combination with a frame, of means for supporting a bottle therein, moving tables for the labels and stopper-coverings, pick-ups therefor, a paste-applying device, and means for actuating the tables, the pick-up devices, and the paste-applying device in proper sequence.

138. In a machine of the character described, the combination with a frame, of a pivoted bottle-support thereon, moving tables for the labels and stopper-coverings, pick-ups therefor, paste-applying devices, and means for moving the bottle-support, the tables, the pick-ups, and the paste-applying device in proper sequence.

139. In a machine of the character described, the combination with a frame, of means for supporting a bottle therein, moving tables for the labels and stopper-coverings, pick-ups therefor, a paste-applying device, a compressor for the stopper-coverings, and means for moving the tables and pick-up devices, the paste-applying device and the compressor in the proper sequence.

140. In a machine of the character described, the combination with a frame, of a pivoted bottle-support thereon, moving tables for the labels and foil, pick-ups therefor, a paste-applying device for the pick-ups, and a compressor for the foil, and means for moving the bottle-support, the pick-ups, the tables, the paste-applying device, and the compressor in proper sequence.

141. In a machine of the character described, the improved tin-foiling device which comprises a support for the foil in detached sheets, a pick-up therefor, and means for moving the foil to engage with the pick-up, means for engaging the foil with the stopper of the bottle, and means for stripping the foil from the pick-up and causing it to engage around the neck of the bottle.

142. In a machine of the character described, the improved tin-foiling device which comprises a support for the tin-foil in detached sheets, a pick-up for the foil, the said pick-up having a central opening, means for causing the pick-up to move toward the bottle and engage with the foil or stopper-covering, and cause the neck of the bottle to enter the opening and strip off the foil from the pick-up, and transfer it to and around the neck of the bottle.

143. In a machine of the character described, the combination with a support for the bottle, and a support for the tin-foil in detached sheets, of a pick-up and means for moving the pick-up to lift a sheet of foil and deposit it over the stopper and around the neck of the bottle.

144. In a machine of the character described, the combination with a support for the bottle, and a support for the tin-foil in detached sheets, of a pick-up for the foil, means for applying paste to the pick-up, and means for moving the pick-up to engage with and around the neck of the bottle and transfer the foil thereto.

145. In a machine of the character described, the combination with a support for the bottle, a support for the tin-foil in detached sheets, a pick-up therefor, and means for moving the pick-up to transfer the sheet-foil from the pick-up to the bottle, and means for compressing the foil around the neck of the bottle.

146. In a machine of the character described, the combination with a support for the bottle, a support for the tin-foil in detached sheets, a pick-up therefor, and means for moving the pick-up to transfer the sheet-foil from the pick-up to the bottle, means for compressing the foil around the neck of the bottle, such means comprising a flexible diaphragm, and fluid-pressure means for engaging the diaphragm with the tin-foil.

147. In a machine of the character described, the combination with a frame, of a table carrying body and neck labels and movable within the frame, and a wiper for simultaneously applying the body and neck labels.

148. In a machine of the character described, the combination with a frame, a single table carrying body and neck labels movable therein, of a paste-applying device for gumming the body and neck labels and means for simultaneously applying the body and neck labels carried by said table.

149. In a machine of the character described, the combination with a frame, a table movable therein, said table carrying body and neck labels, of a pick-up, a movable paste-applying device for transferring paste to the pick-up, means for engaging the labels with the pick-up, and means for removing the labels from the pick-up and applying them to the bottle simultaneously.

150. In a machine of the character described, the combination with a frame, a body and neck label table movable therein, a pick-up for removing the labels from the table, a stopper-covering table movable in the frame, of a movable paste-reservoir for applying paste to the pick-ups, a single set of wipers for simultaneously applying the body and neck labels to the bottle and fluid-pressure means for applying the stopper-covering to the stopper and neck of the bottle.

151. In a machine of the character described, the combination with a frame, means for supporting a bottle thereon, means for supplying body and neck labels, a pick-up, means for supplying paste to the pick-up, means for engaging the labels with the pick-up, means for engaging the labels with the bottle and means for simultaneously transferring the labels from the pick-up to the bottle, of a shaft, and means actuated by the movement of the shaft for moving the paste-applying means, the label-supplying means, the pick-up and transferring means, and the bottle in proper sequence.

152. In a machine of the character described the combination with a frame, and means for supporting a bottle thereon, of a body and neck label table, a label pick-up, a stopper-covering table, a stopper-covering pick-up, means for applying paste to the pick-ups, and means for applying the body and neck labels and stopper-coverings to the bottle in proper sequence.

153. In a machine of the character described, the combination with a frame and movable means for supporting a bottle thereon, a movable table carrying body and neck labels, a label pick-up, a movable table carrying stopper-coverings, a stopper-covering pick-up, means for applying paste to the pick-ups, means for simultaneously transferring the labels to the label pick-up, means for transferring a stopper-covering to its pick-up, means for applying the stopper-cover over the stopper and neck of the bottle, means for simultaneously applying the labels to the body and neck of the bottle, and means for moving the bottle away from the labeling and covering means, of a shaft, and means actuated by the movement of the shaft for moving the paste-applying means, the bottle toward the label-table, the label-table, the stopper-covering table, the label pick-up, the stopper-covering pick-up, the means for applying the stopper-cover, the means for applying the labels, and the bottle away from the tables in proper sequence.

154. In a machine of the character described, the combination with a frame, of a movable bottle-support thereon, supports for labels and stopper-coverings, pick-ups, a paste-applying device, a chamber for compressing the stopper-coverings, means for supplying the chamber with pressure, a shaft, and connections actuated by the rotation of the shaft for actuating the paste-applying device, the pick-ups, and the compressor in proper sequence.

155. In a machine of the character described, the combination with a frame of a movable bottle-support thereon, supports for body and neck labels and stopper-coverings, pick-ups, a paste-applying device, a chamber for compressing the stopper-coverings, means for supplying the chamber with pressure, a shaft, and connections actuated by the rotation of the shaft for actuating the paste-applying device, the pick-ups, and the compressor in proper sequence.

156. In a machine of the character described, the combination with a frame having guides therein, of a movable bottle-support thereon, of supports for labels and stopper-coverings, pick-ups, a paste-applying device, a chamber for compressing the stopper-coverings around the neck of the bottle, means for supplying the chamber with pressure, a shaft, and a cam thereon, and connections between the cam and pick-ups and paste-applying device and compressor for operating them in proper sequence.

157. In a machine of the character described, the combination with a frame having guides therein, of a movable bottle-support thereon, of supports for body and neck labels and stopper-coverings, pick-ups, a paste-applying device, a chamber for compressing the stopper-coverings around the neck of the bottle, means for supplying the chamber with pressure, a shaft, and a cam thereon, and connections between the cam and pick-ups and paste-applying device and compressor for operating them in proper sequence.

158. In a machine of the character described, the combination with a frame, of means for movably supporting a bottle therein, means for moving the bottle, means for supporting a stopper-covering, a carriage, a pick-up supported on the frame, movable connections between the pick-up and carriage, means for causing the stopper-covering to engage with the pick-up, means for tilting the pick-up to a position over the stopper of the bottle, means for moving the pick-up relatively to the bottle to transfer the covering from the pick-up to the bottle and means for engaging the covering around the neck of the bottle.

159. In a machine of the character described, the combination with a frame, of means for movably supporting a bottle therein, means for moving the bottle, means for supporting a stopper-covering, a carriage, a pick-up supported on the frame, movable connections between the pick-up and carriage, means for causing the stopper-covering to engage with the pick-up, means for tilting the pick-up to a position over the stopper of the bottle, means for moving the pick-up relatively to the bottle to transfer the covering from the pick-up to the bottle and means actuated by fluid-pressure for engaging the covering around the neck of the bottle.

160. In a machine of the character described, the combination with a frame, guides within the frame and a plurality of tables movable in the guides, of a shaft, means actuated by the revolution of the shaft for reciprocating the tables and means for locking the tables against movement.

161. In a machine of the character described, the combination with a frame, guides within the frame, a plurality of tables movable in the guides, of a shaft, means actuated by the rotation of the shaft for yieldingly reciprocating the tables and means for locking the tables against movement.

162. In a machine of the character described, the combination with a frame, means for supporting a bottle within the frame, guides within the frame, a plurality of tables movable in the guides, of a shaft, means actuated by the rotation of the shaft for yieldingly reciprocating the tables and means for locking one or more of the tables against movement.

163. In a machine of the character described, the combination with a frame, a plurality of reciprocating tables movable in the frame, of a shaft, and means actuated by the rotation of the shaft for independently reciprocating the tables, and means for locking the tables against movement.

This specification signed and witnessed this 27th day of June, 1904.

CURTIS HOLLAND.

Witnesses:
C. H. SMITH,
JAS. E. DAVIDSON.